US012068566B2

(12) United States Patent
Scanzillo et al.

(10) Patent No.: US 12,068,566 B2
(45) **Date of Patent: *Aug. 20, 2024**

(54) TERMINATIONS FOR ELECTRICAL WIRING DEVICES

(71) Applicant: Hubbell Incorporated, Shelton, CT (US)

(72) Inventors: Thomas L. Scanzillo, Monroe, CT (US); Matthew Jared Varney, Stratford, CT (US); Thomas Joseph Conti, Poughkeepsie, NY (US); Connor Thomas Grant, Toms River, NJ (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,997

(22) Filed: Oct. 10, 2022

(65) Prior Publication Data

US 2023/0036314 A1 Feb. 2, 2023

Related U.S. Application Data

(63) Continuation of application No. 16/863,581, filed on Apr. 30, 2020, now Pat. No. 11,495,895.

(Continued)

(51) Int. Cl.
*H01R 4/50* (2006.01)

(52) U.S. Cl.
CPC .................................. *H01R 4/5008* (2013.01)

(58) Field of Classification Search
CPC ...... H01R 4/50; H01R 4/4836; H01R 4/4827; H01R 4/00

(Continued)

(56) References Cited

U.S. PATENT DOCUMENTS 1,994,880 A 3/1935 Wallbillich
2,015,858 A 10/1935 Leviton (Continued)

FOREIGN PATENT DOCUMENTS

CA 981354 1/1976
CA 1202095 3/1986

(Continued)

OTHER PUBLICATIONS

Wago Cage Clamp Tech Brochure, Sep. 2010 (22 pages).

(Continued)

*Primary Examiner* — William H. Mayo, III
(74) *Attorney, Agent, or Firm* — Wissing Miller LLP

(57) ABSTRACT

The electrical wiring device includes a cover and a base. The base has a wire chamber supporting a wire termination assembly. The wire termination assembly includes a wire fastening member and a conductive member. The wire fastening member has a cam surface and is rotatable between an open position and a securing position. The conductive member is positioned in close proximity to the wire fastening member such that a gap is provided between the wire fastening member and the conductive member when the wire fastening member is in the open position. When the wire fastening member is rotated from the open position to the securing position, the cam surface rotates to reduce the size of the gap between the wire fastening member and the conductive member.

27 Claims, 28 Drawing Sheets

Related U.S. Application Data

(60) Provisional application No. 62/841,335, filed on May 1, 2019.

(58) Field of Classification Search
USPC .......... 174/50, 520, 535, 542, 59, 68.1, 68.3
See application file for complete search history.

(56) References Cited

U.S. PATENT DOCUMENTS 2,082,994 A 6/1937 Wallbillich
2,163,722 A 6/1939 Wallbillich
2,175,098 A 10/1939 Wertzheiser
2,201,743 A 5/1940 Petersen
2,201,751 A 5/1940 Petersen
2,238,386 A 4/1941 Frank
2,463,033 A 3/1949 Harnett
2,466,930 A 4/1949 Cook
2,506,212 A 5/1950 Cook
2,763,847 A 9/1956 Hubbell
2,556,491 A 6/1959 DeLorenzo
2,952,831 A 9/1960 Ehrlich
3,431,546 A 3/1969 Averill
3,439,315 A 4/1969 Hamel
3,660,728 A 5/1972 Carter
3,713,071 A 1/1973 Poliak
3,740,613 A 6/1973 Strachan
3,793,607 A 2/1974 Smith
3,891,293 A 6/1975 Jones
3,904,266 A 9/1975 Fitzpatrick
3,944,314 A 3/1976 Weitzman
3,945,711 A 3/1976 Hohorst
3,999,829 A * 12/1976 Glaesel .................... H01R 9/26
439/864
4,060,305 A 11/1977 Poliak
4,099,826 A 7/1978 Mazzeo
4,172,628 A * 10/1979 Lingaraju ............ H01R 4/4818
439/441
4,241,498 A 12/1980 Brandeau
4,255,655 A 3/1981 Kikuchi
4,296,987 A 10/1981 Ingaraju
4,372,693 A 2/1983 Lutz
4,537,560 A 8/1985 Emeterio
4,748,431 A 5/1988 Saunders et al.
4,749,368 A 6/1988 Mouissie
4,759,726 A * 7/1988 Naylor ................. H01R 4/5008
439/441
4,767,340 A 8/1988 Hohorst
4,768,981 A 9/1988 Hohorst
4,793,823 A 12/1988 Cozzens
4,886,472 A 12/1989 Tsai
4,995,829 A * 2/1991 Geib .................... H01R 4/2433
439/409
5,015,201 A 5/1991 Brezee
5,057,649 A 10/1991 Ring
5,138,296 A 8/1992 Borchardt et al.
5,151,642 A 9/1992 Lombardi
5,181,310 A 1/1993 Josephson
5,262,749 A 11/1993 Kopelman
5,637,011 A 6/1997 Meyerhoefer
5,685,735 A 11/1997 Hohorst
5,810,625 A 9/1998 Klein
5,825,602 A 10/1998 Tosaka
5,866,844 A 2/1999 Osterbrock
5,975,938 A * 11/1999 Libby .................. H01R 4/2412
439/410
5,975,940 A 11/1999 Hartmann
5,995,350 A 11/1999 Kopelman
6,049,143 A 4/2000 Simpson
6,146,217 A 11/2000 Osada
6,336,824 B1 1/2002 Sorig
6,368,149 B1 4/2002 Schmidt
6,388,216 B1 5/2002 Puhalla
6,406,323 B2 6/2002 Chung Long Shan
6,474,378 B1 11/2002 Ryan
6,477,021 B1 11/2002 Haun
6,689,955 B2 * 2/2004 Doutaz ................ H01R 4/5008
439/828
6,707,652 B2 3/2004 Engel
6,712,641 B2 3/2004 Beege
6,743,029 B1 6/2004 Greene
6,750,402 B2 6/2004 Geske
6,786,779 B2 9/2004 Feldmeier
6,802,747 B1 10/2004 Orange
6,814,608 B2 11/2004 Kollmann
6,827,602 B2 12/2004 Greene
6,861,189 B1 3/2005 Greene
6,893,286 B2 5/2005 Drewes et al.
6,926,543 B2 8/2005 Poh
6,943,310 B2 9/2005 Eisenhower
6,948,846 B2 9/2005 Engel
7,052,335 B2 * 5/2006 Matsuura ............... H01R 12/75
439/783
7,097,518 B2 8/2006 Kraemer
7,103,968 B2 9/2006 Karrasch
7,114,986 B1 10/2006 Toly
7,115,001 B1 10/2006 Brockman
7,118,404 B2 10/2006 Ploessner
7,140,887 B2 11/2006 Poh
7,150,646 B2 12/2006 Trumper
7,164,082 B2 1/2007 Kurek
7,175,485 B1 2/2007 Alderson
7,241,188 B2 7/2007 Lin
7,249,963 B2 7/2007 Ramm
7,270,581 B2 9/2007 Tiberio
7,507,106 B2 3/2009 Keswani et al.
7,544,103 B2 6/2009 Walter et al.
7,547,226 B2 * 6/2009 Koessler .............. H01R 9/2441
439/409
7,651,363 B2 1/2010 Koellmann
7,704,106 B2 4/2010 Koellmann
7,815,463 B2 10/2010 Gerberding
7,845,970 B2 12/2010 Stromiedel
7,909,664 B2 3/2011 Ilkhanov
7,963,812 B2 6/2011 Ilkhanov
8,047,883 B2 11/2011 Montalbano et al.
8,137,145 B2 * 3/2012 Joy ...................... H01R 13/652
439/864
8,251,738 B2 8/2012 Heckert et al.
8,292,677 B2 10/2012 Gassauer
8,328,588 B2 12/2012 Ramm et al.
8,388,387 B2 3/2013 Koellmann
8,408,952 B2 4/2013 Wu
8,480,424 B2 * 7/2013 Koellmann .......... H01R 4/4845
439/358
8,535,084 B2 9/2013 Koellmann
8,632,355 B2 1/2014 Hartmann
8,794,994 B2 8/2014 Koellmann et al.
8,998,634 B2 4/2015 Koellmann
9,124,034 B2 9/2015 Koellmann et al.
9,130,285 B2 9/2015 Scanzillo et al.
9,209,530 B2 12/2015 Gassauer et al.
9,413,082 B2 8/2016 Gassauer
9,466,895 B2 10/2016 Kollmann et al.
9,478,874 B2 10/2016 Stolze
9,502,790 B2 11/2016 Kollmann et al.
9,525,219 B2 12/2016 Kollmann et al.
9,543,700 B2 1/2017 Kollmann et al.
9,601,844 B2 3/2017 Gassauer et al.
9,614,301 B2 4/2017 Ludewig et al.
9,761,964 B2 9/2017 Meyer
9,842,408 B2 12/2017 Milne
10,131,061 B2 11/2018 Krans
10,141,674 B2 11/2018 Scanzillo et al.
10,427,201 B2 10/2019 Bungter
10,431,950 B2 10/2019 Rzasa
10,461,444 B2 10/2019 Scanzillo et al.
10,630,036 B2 4/2020 Rzasa
10,637,165 B2 4/2020 Scanzillo et al.
10,965,042 B2 3/2021 Scanzillo et al.
10,992,067 B2 * 4/2021 Geske .................. H01R 4/4836
11,063,396 B2 7/2021 Iaconis et al.
2004/0077210 A1 4/2004 Kollmann
2004/0248457 A1 12/2004 Walter

(56) References Cited

U.S. PATENT DOCUMENTS

| | | | |
|---|---|---|---|
| 2005/0042912 A1 | 2/2005 | Drewes et al. | |
| 2005/0090159 A1* | 4/2005 | Luther | H01R 4/4836 439/835 |
| 2005/0212646 A1 | 9/2005 | Watchorn | |
| 2006/0028316 A1 | 2/2006 | Fabian | |
| 2006/0288140 A1 | 12/2006 | Lin | |
| 2007/0006558 A1 | 1/2007 | Ramm | |
| 2007/0026701 A1 | 2/2007 | Kurek | |
| 2007/0207662 A1 | 9/2007 | Germani | |
| 2007/0238348 A1 | 10/2007 | Kopelman | |
| 2008/0013239 A1 | 1/2008 | Kopelman | |
| 2010/0186234 A1 | 7/2010 | Binder | |
| 2010/0304596 A1 | 12/2010 | Tkhanov | |
| 2010/0304597 A1 | 12/2010 | Ilkhanov | |
| 2011/0207361 A1 | 8/2011 | Heckert et al. | |
| 2014/0227914 A1 | 8/2014 | Tedeschi | |
| 2015/0257636 A1 | 9/2015 | Kohler | |
| 2015/0314434 A1 | 11/2015 | Bevins, Jr. | |
| 2019/0160643 A1 | 5/2019 | Lefavour | |
| 2019/0221951 A1 | 7/2019 | Lotkemann et al. | |
| 2020/0235541 A1 | 7/2020 | Rzasa | |
| 2021/0203087 A1 | 7/2021 | Scanzillo et al. | |

FOREIGN PATENT DOCUMENTS

| | | |
|---|---|---|
| CA | 1203591 | 4/1986 |
| CA | 2939110 | 8/2015 |
| CA | 2996306 | 3/2017 |
| CN | 101051711 A | 10/2007 |
| CN | 201233969 | 5/2009 |
| CN | 101807756 | 8/2010 |
| CN | 103606765 | 2/2014 |
| CN | 103682774 | 3/2014 |
| CN | 103840294 | 6/2014 |
| CN | 205004486 | 1/2016 |
| CN | 205016755 | 2/2016 |
| DE | 102015119247 | 5/2017 |
| EP | 0131425 | 2/1991 |
| EP | 01553660 | 7/2005 |
| EP | 01490928 | 10/2005 |
| EP | 1608039 | 12/2005 |
| FR | 2312767 | 12/1976 |
| GB | 2272799 | 5/1994 |
| GB | 2292850 | 3/1996 |
| GB | 2393043 | 3/2004 |
| JP | 61014529 | 1/1986 |
| WO | 97003480 | 1/1997 |
| WO | 2017035469 | 3/2017 |
| WO | 2017035518 | 3/2017 |
| WO | 2017125441 | 7/2017 |

OTHER PUBLICATIONS

Marinco Power Products, Straight Blade Clamp-Lock (TM) Devices (15A & 20A), 2016 (3 pages).
Lex Connector Power Conn Brochure, 2019 (12 pages).

* cited by examiner

Fig. 17
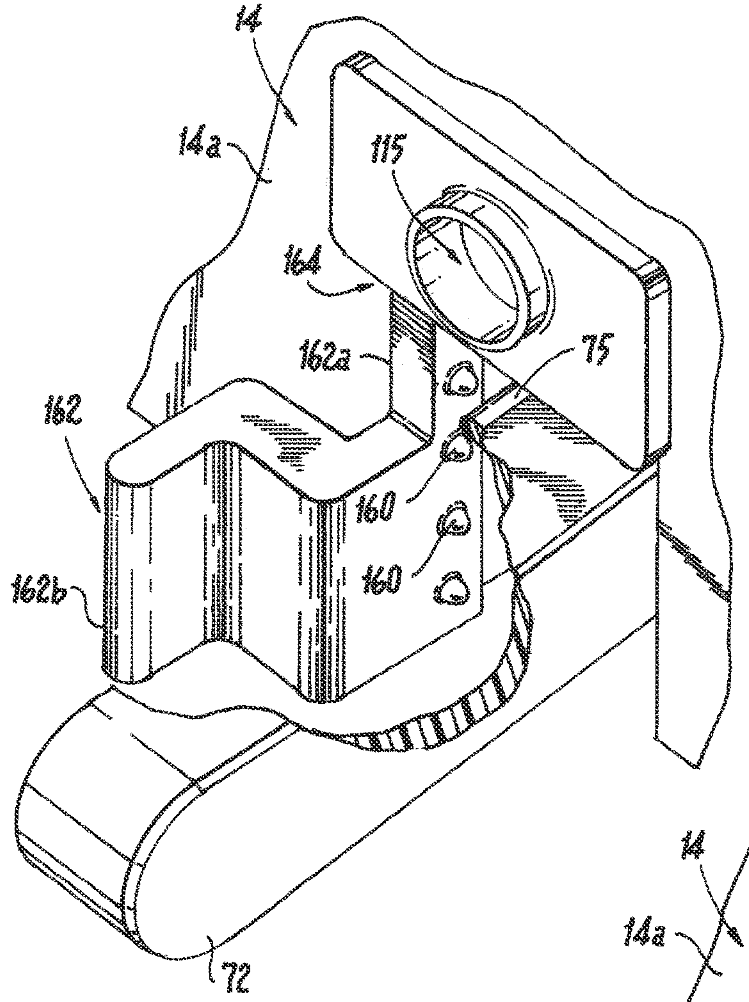
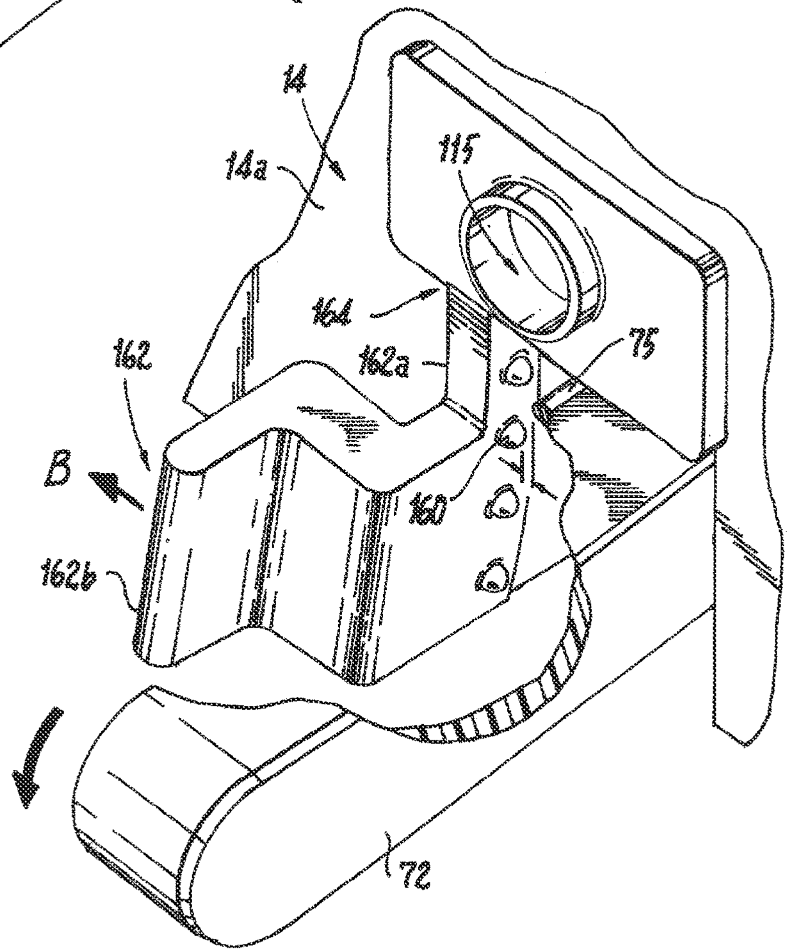
Fig. 18

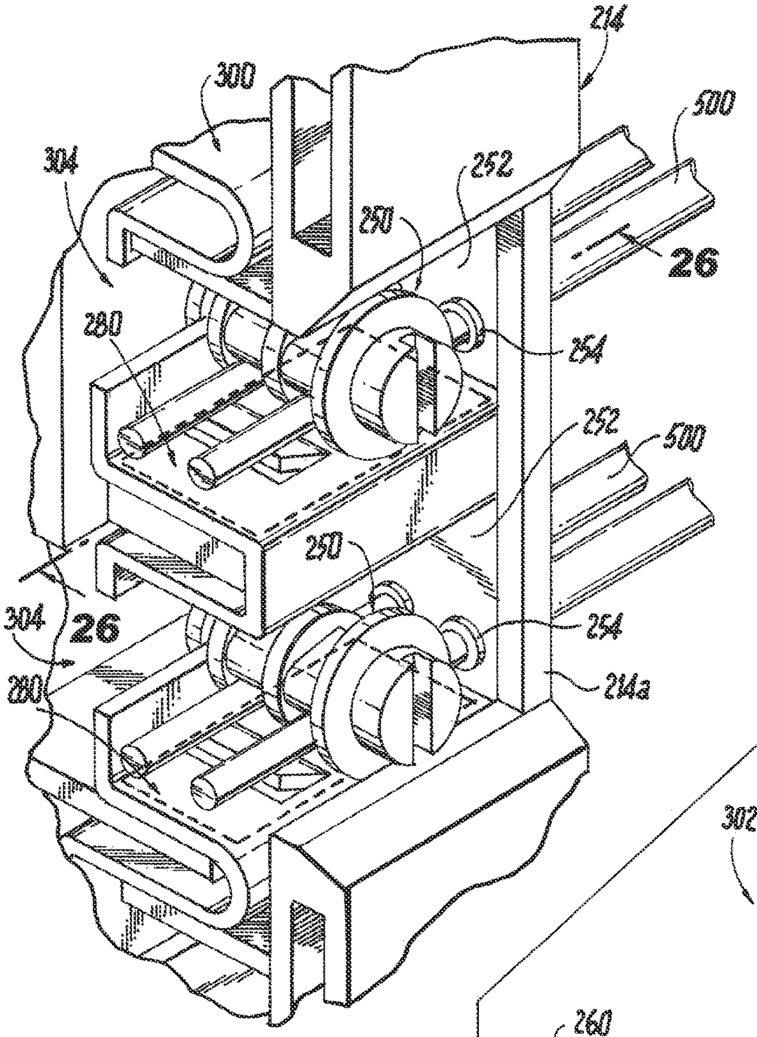
Fig. 22
Fig. 23
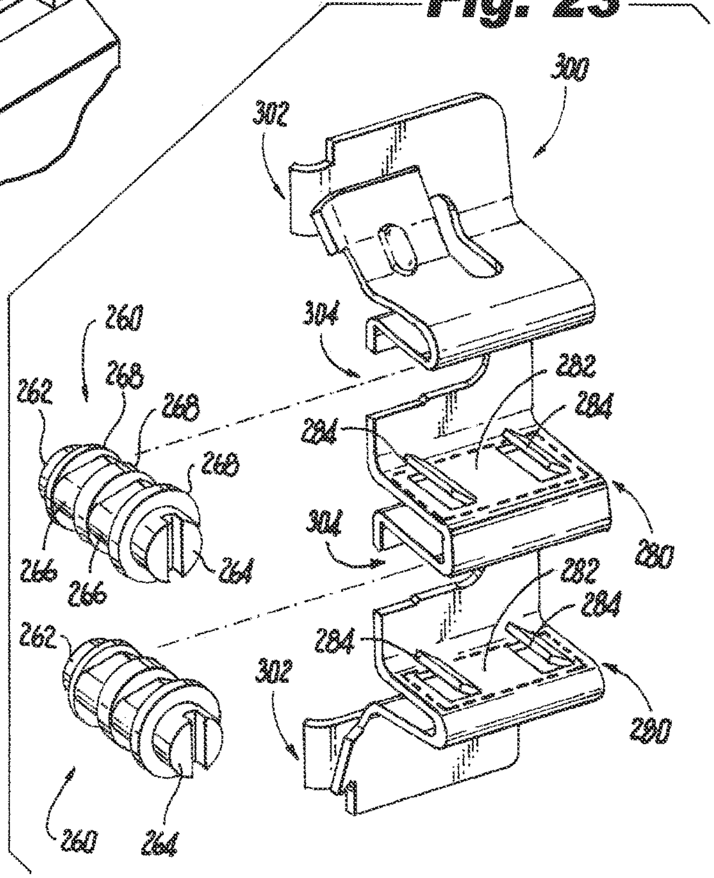

TERMINATIONS FOR ELECTRICAL WIRING DEVICES

CROSS REFERENCE TO RELATED APPLICATIONS

This application is a continuation of co-pending U.S. patent application Ser. No. 16/863,581 filed on Apr. 30, 2022, and claims benefit from U.S. Provisional Patent Application Ser. No. 62/841,335 filed on May 1, 2019, the contents of each are incorporated herein in their entirety by reference.

BACKGROUND

Field

The present disclosure relates generally to electrical wiring devices, and more specifically, to electrical wiring devices having cam activated wire termination assemblies.

Description of the Related Art

Electrical wiring devices are typically provided with wire terminations for terminating electrical wires, for example, neutral terminations, line terminations, and ground terminations, etc. Together these terminations, depending on the mechanical configuration, may be connected to electrical wires using several presently known terminations. One termination is referred to as terminal screw type termination, where a length of bare wire is wrapped around a set screw. The set screw is then tightened causing the head of the set screw to secure the bare wire between the head of the screw and a metallic terminal plate. Another type of wire termination is referred to as a "push-in" termination. Push-in terminations are terminals in which a small hole is available in the outer housing of a wiring device for insertion of a bare length of wire. The bare length of wire is inserted into the hole and a cage clamp provides a clamping force on the bare wire to maintain the wire in contact with a terminal plate. The cage clamp provides resistance against the wire being pulled out of the hole and out of contact with the terminal plate.

The present disclosure provides a new type of wire termination that includes one or more tool or lever activated wire termination assemblies that is fast and convenient for an electrician to install.

SUMMARY

The present disclosure provides descriptions of embodiments of electrical wiring devices having cam activated wire termination assemblies. In one exemplary embodiment, the electrical wiring device includes a cover and a base. The base has a wire chamber supporting a wire termination assembly. The wire termination assembly includes a wire fastening member and a conductive member. The wire fastening member has a cam surface and is rotatable between an open position and a securing position. The conductive member is positioned in close proximity to the wire fastening member such that a gap is provided between the wire fastening member and the conductive member when the wire fastening member is in the open position. When the wire fastening member is rotated from the open position to the securing position, the cam surface rotates to reduce the size of the gap between the wire fastening member and the conductive member.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 17 is a perspective view of a locking system for the grounding portion of the electrical wiring device taken from detail 17 in FIG. 2, illustrating the ground wire fastening member partially cut away to reveal detents of the locking system used to lock the ground wire fastening member of the ground wire termination assembly in the securing position;

FIG. 18 is a perspective view of the locking system of FIG. 17, illustrating a lateral force applied to a locking system to move the detents of the locking system away from the ground wire fastening member to unlock the locking system permitting the ground wire fastening member to move to the open position;

FIG. 22 is a perspective view of a portion of the body of the electrical wiring device of FIG. 21, illustrating multiple electrical wires positioned with wire chambers within the body;

FIG. 23 is a perspective view of an exemplary embodiment of multiple wire termination assemblies according to the present disclosure, each wire termination assembly including a conductive member and a wire fastening member that can be used with the electrical wiring device of FIG. 21;

DETAILED DESCRIPTION

The present disclosure provides descriptions of embodiments for electrical wiring devices that include improved wire termination assemblies. The electrical wiring devices contemplated by the present disclosure may include, for example, receptacles, switches, fault circuit interrupters, such as ground fault circuit interrupters and arc fault circuit interrupters, transient surge suppressors, such as transient voltage surge suppressors, occupancy sensors, dimmers, timers, and low voltage devices, such as USB chargers, and any other electrical wiring devices where an electrical wire or conductor is terminated.

For ease of description the electrical wiring devices may also be referred to herein as the "device" in the singular and the "devices" in the plural. The electrical wire (or conductor) may be a solid or stranded electrical wire. The electrical wire may also be referred to herein as the "wire" in the singular and the "wires" in the plural. The specification and drawings are to be regarded in an illustrative sense rather than a restrictive sense. Various modifications may be made thereto without departing from the spirit and scope of the present disclosure.

According to an embodiment of the present disclosure, the electrical wiring device has a cover, a base secured to the cover by snap-fit connections, fasteners or welds, e.g., sonic welds, and a mounting strap, which is also known as a yoke. In one exemplary embodiment, the base may include one or more line phase wire termination assemblies and one or more neutral wire termination assemblies, and the yoke may include one or more ground wire termination assemblies. A rear surface of such a base may also include one or more line phase wire entry apertures, one or more neutral wire entry apertures and one or more ground wire entry apertures. In another exemplary embodiment, the base may include one or more line phase wire termination assemblies and a ground wire termination assembly. A rear surface of such a base may also include one or more line phase wire entry apertures and one or more ground wire entry apertures. In one exemplary embodiment, the yoke may extend through the cover. In another exemplary embodiment, the yoke may extend around the outer perimeter of the base from one portion of the cover to another portion of the cover. The yoke can be snap fitted to the cover and base to at least partially secure the cover to the base.

Figure 1:
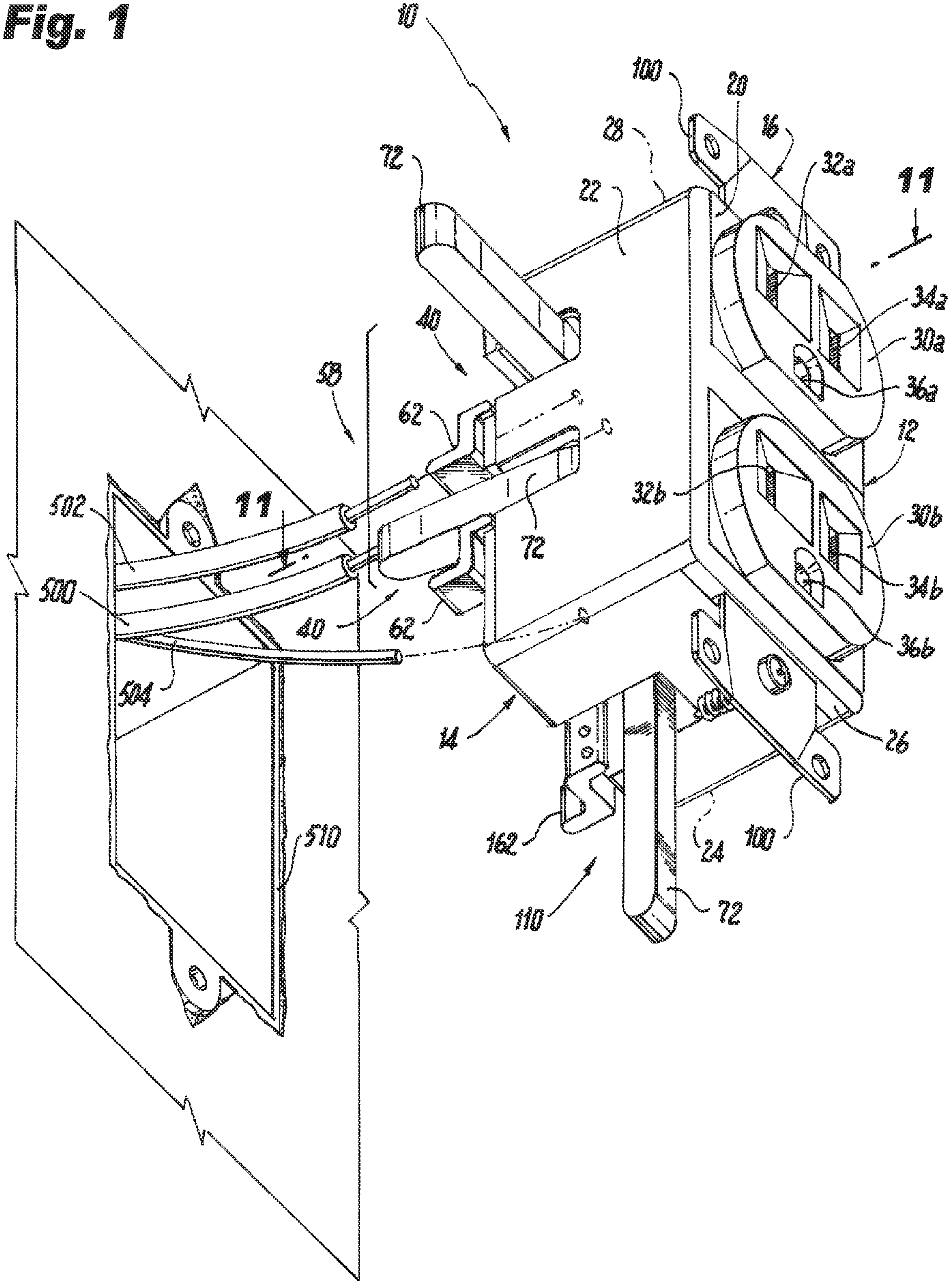
FIG. 1 is a front perspective view of an exemplary embodiment of an electrical wiring device according to the present disclosure positioned for connection to electrical wires within an electrical box, and illustrating wire fastening members of multiple wire termination assemblies used to releasably secure the electrical wires to the wire termination assemblies with some of the wire fastening members in an open position and some of the wire fastening members in a securing position.
Figure 2:
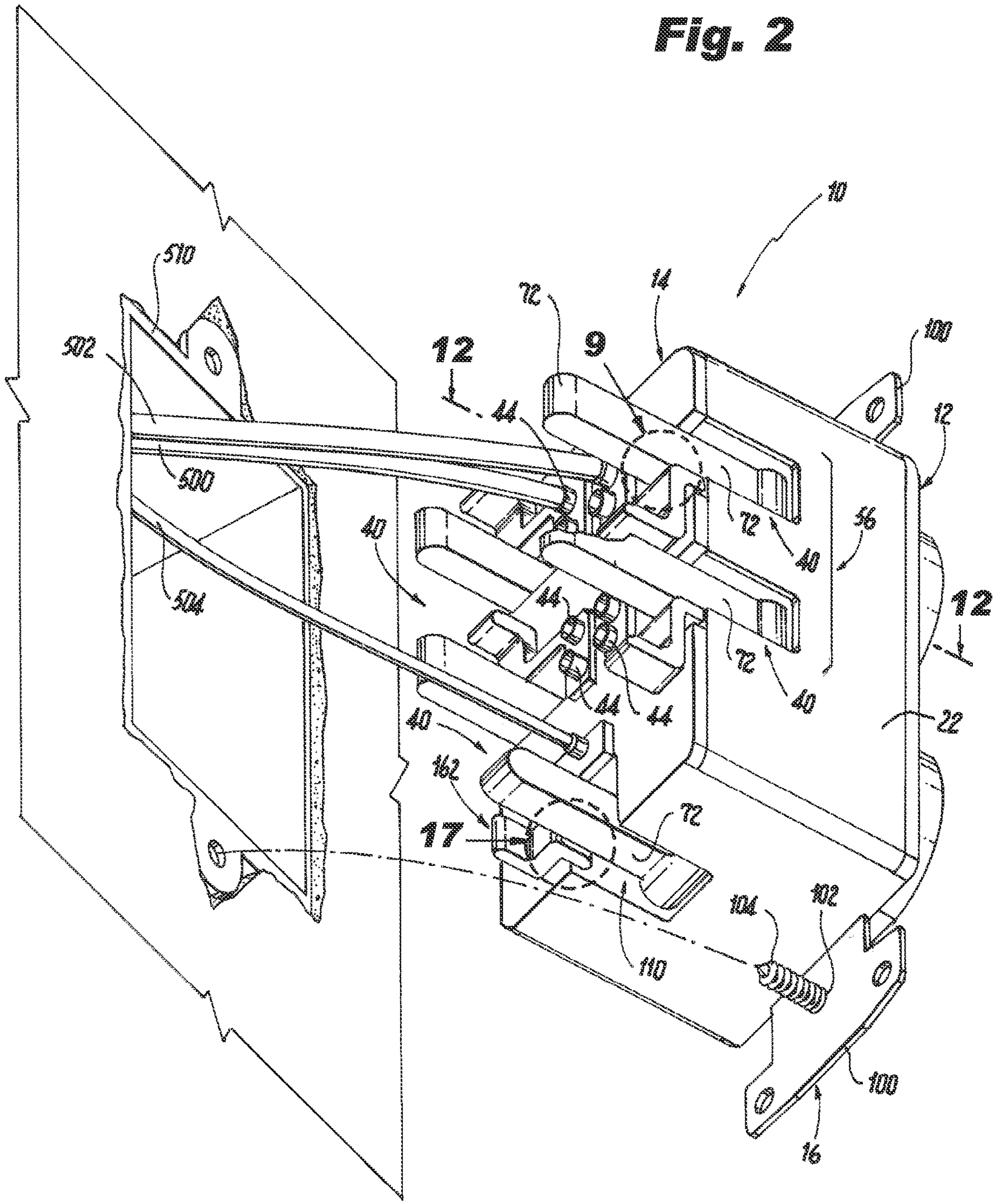
FIG. 2 is a rear perspective view of the electrical wiring device of FIG. 1, illustrating the electrical wires within the electrical wiring device and releasably secured to wire termination assemblies within the electrical wiring device.
Figure 3:
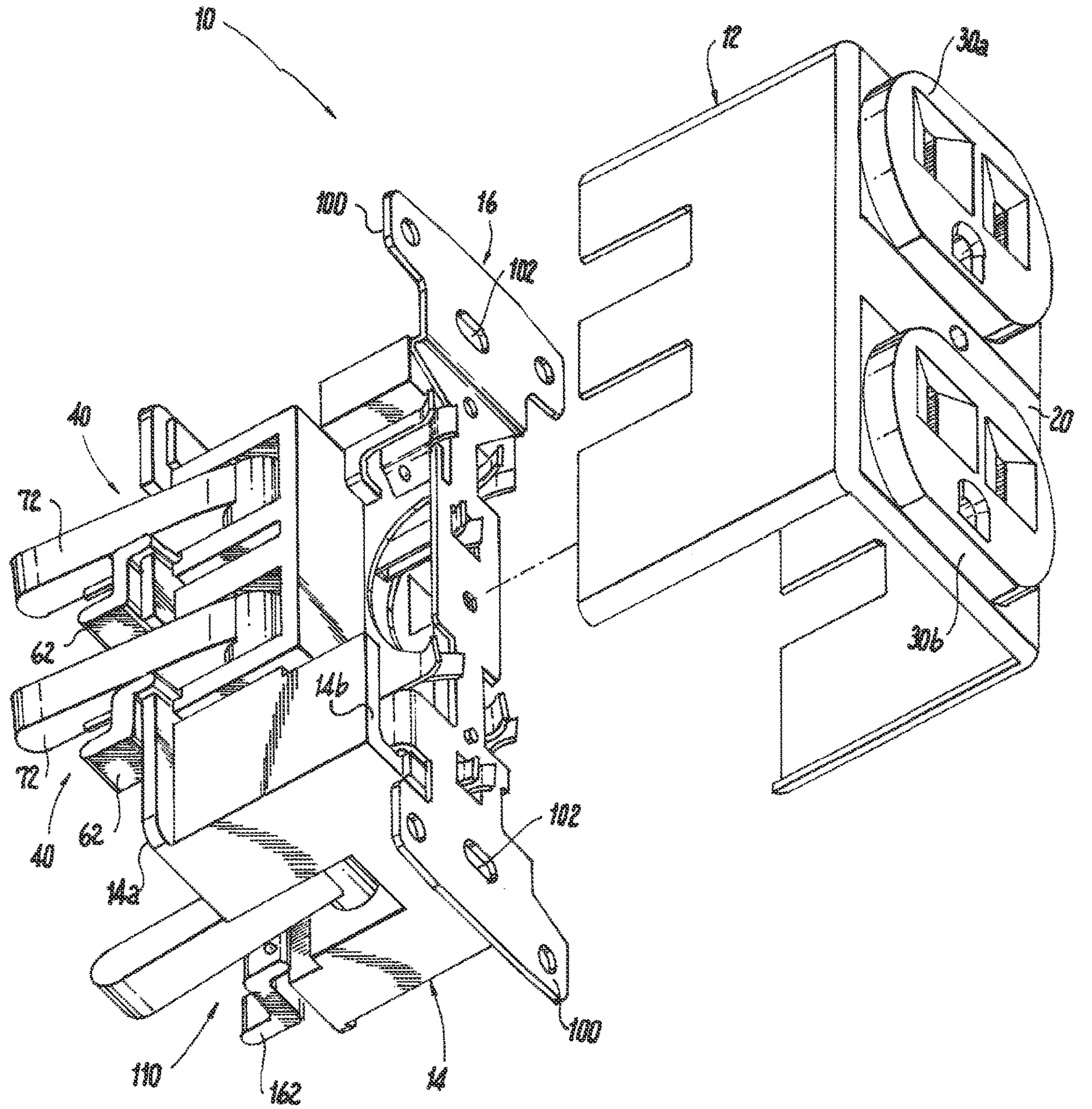
FIG. 3 is an exploded perspective view of a first side of the electrical wiring device of FIG. 1, illustrating a cover separated from a body of the electrical wiring device, and wire termination assemblies within the body used to releasably secure the electrical wires to the electrical wiring device.

Referring now to FIGS. 1-4, an exemplary embodiment of a device according to the present disclosure is shown. In this exemplary embodiment, the device 10 is a duplex receptacle. The device 10 includes a cover 12, a base 14 and a yoke 16. In this exemplary embodiment the yoke 16 is secured to the base 14, and the cover 12 covers a portion of the base 14 and a portion of the yoke 16, as shown in FIGS. 1 and 3, and is secured to the base 14. The cover 12 may be secured to the base 14 using, for example, one or more fasteners, welds, e.g., sonic welds, or one or more snap projections configured to engage corresponding recesses in the base 14 such that when snap projections are fully inserted into recesses, the cover 12 is at least partially secured the base 14.

In this exemplary embodiment, the cover 12 of the device 10, here a duplex receptacle, includes a front wall 20, side walls 22 and 24, and end walls 26 and 28. The front wall 20, side walls 22 and 24, and end walls 26 and 28 form an open central interior portion configured to receive or cover the internal components of the device 10 attached to the base 14 and/or the yoke 16 which are described in more detail below. The front wall 20 in this exemplary embodiment includes a first plug receiving face **30*a* having apertures or slots 32*a* and 34*a* configured to receive the blades of a first plug, and an ground aperture 36*a* configured to receive the ground prong of the first plug. The front surface 20 also includes a second plug receiving face 30*b* having apertures or slots 32*b* and 34*b* configured to receive the blades of a second plug, and an aperture 36*b*** configured to receive the ground prong of the second plug.

Figure 4:
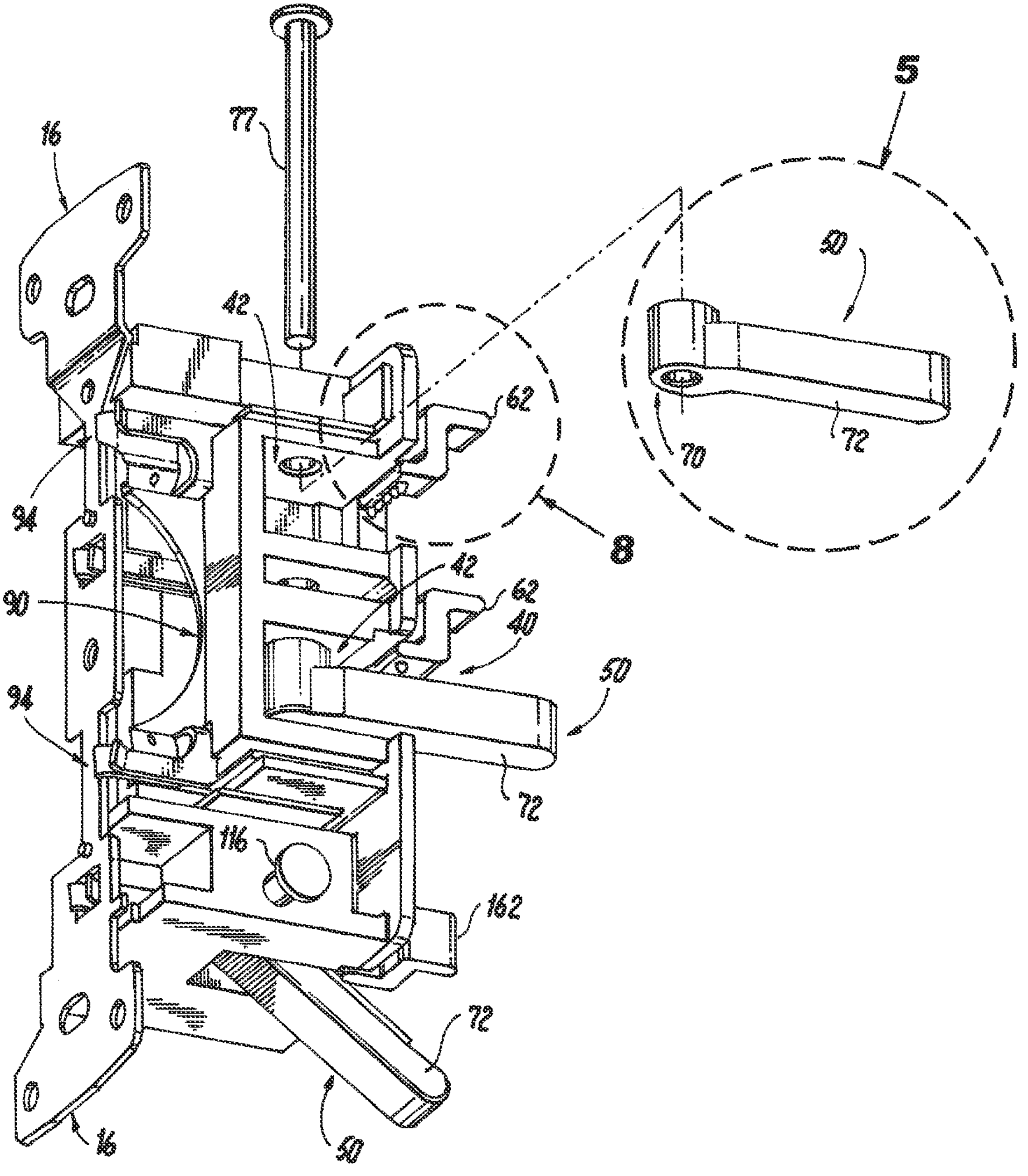
FIG. 4 is a perspective view with parts separated of a second side of the body of the electrical wiring device of FIG. 1.

Continuing to refer to FIGS. 1-4, the base 14 is configured and dimensioned to support one or more wire termination assemblies 40 that provide terminations for wires providing electrical power to the device 10. Each of the one or more wire termination assemblies 40 are positioned within a wire chamber 42 in the base 14, as seen in FIG. 4. A bottom wall **14*a*, seen in FIG. 9, of the base 14 adjacent each wire chamber 42 includes one or more wire entry apertures 44, seen in FIG. 2, through which a wire can pass from an exterior of the device 10 into a wire chamber 42. Each wire termination assembly 40 includes a wire fastening member 50 and a conductive member 52, seen in FIG. 6. Each wire termination assembly is positioned within a wire chamber 42 in the base 14, seen in FIG. 8. According to the exemplary embodiment of FIGS. 1-4, the device is a duplex receptacle having four wire termination assemblies 40 and four wire chambers 42. Two of the four wire termination assemblies 40 are line termination assemblies 56 used to terminate one or more line (or phase) wires 500, seen in FIGS. 1 and 2, and two of the four wire termination assemblies 40 are neutral termination assemblies 58 used to terminate one or more neutral wires 502. If the device 10 were a single receptacle, the one or more wire termination assemblies 40 may include two wire termination assemblies 40. In such an embodiment, one of the two wire termination assemblies 40 may be a line termination assembly 56 used to terminate one or more line (or phase) wires 500, and one of the two wire termination assemblies 40 may be a neutral termination assembly 58** used to terminate one or more neutral wires 502. If the device 10 were a single pole toggle switch, the one or more wire termination assemblies 40 may include two wire termination assemblies. In such an embodiment, one of the two wire termination assemblies 40 may be a first line termination assembly 56 used to terminate one or more line wires, and one of the two wire termination assemblies 40 may be a second line termination assembly 56 used to terminate one or more switch leg wires.

Figure 5:
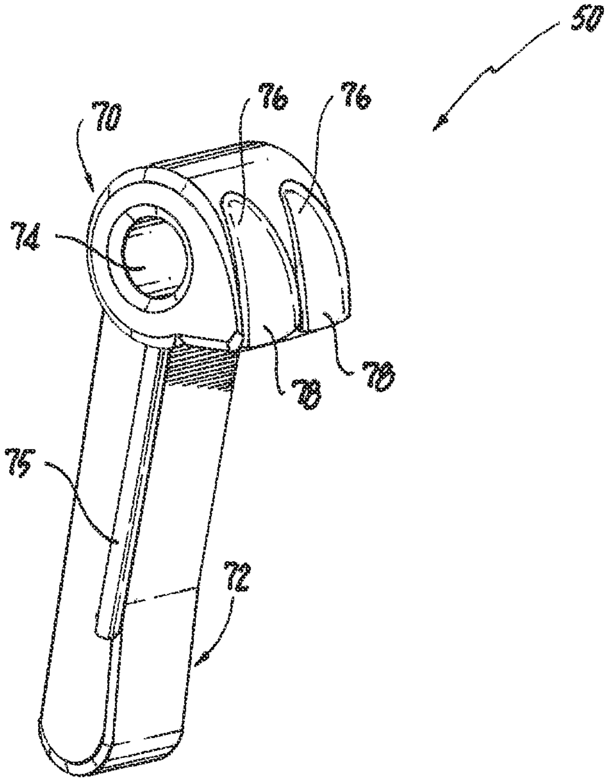
FIG. 5 is a perspective view of an exemplary embodiment of a wire fastening member of a wire termination assembly used to releasably secure electrical wires to the wire termination assembly taken from detail 5 in FIG. 4.
Figure 6:
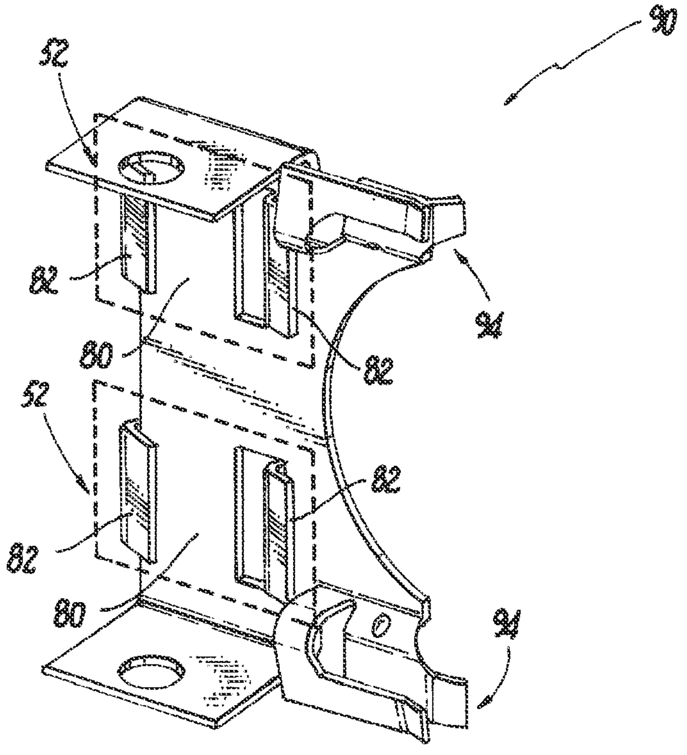
FIG. 6 is a perspective view of a first side of an exemplary embodiment of an electrical contact assembly within the electrical wiring device of FIG. 1.
Figure 7:
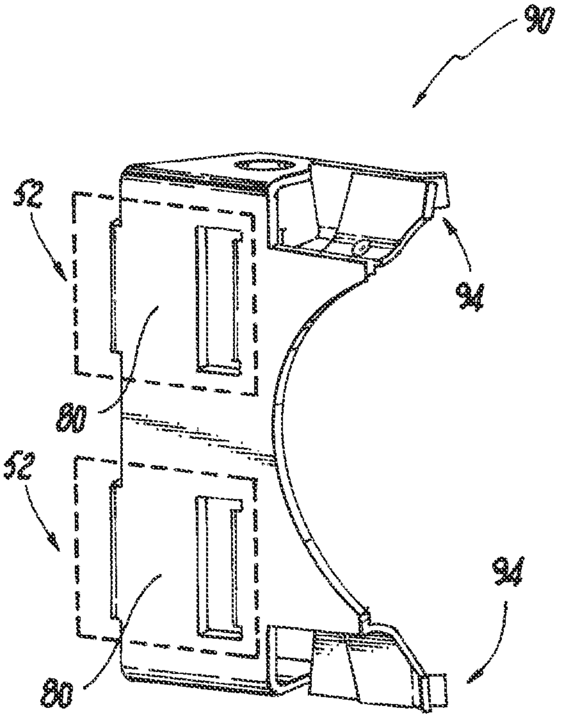
FIG. 7 is a perspective view of a second side of the electrical contact assembly of FIG. 6.

Referring to FIGS. 5-7, as noted above, each wire termination assembly 40 includes a wire fastening member 50 and a conductive member 52 positioned within a wire chamber 42 in the base 14, seen in FIG. 4. In the exemplary embodiment of FIG. 5, the wire fastening member 50 is a cam lever having a cam body 70 and a lever arm 72. The cam body 70 includes a mounting aperture 74 used to mount the wire fastening member 50 within its respective wire chamber 42 so that the cam body 70 can pivot or rotate within the wire chamber 42. More specifically, the mounting aperture 74 receives a mounting pin 77, seen in FIG. 4, that extends through the wire chamber 42 and a portion of the body 14 to movably secure the wire fastening member 50 within the wire chamber 42. In this configuration, the rotating or pivoting of the lever arm 72 causes the cam body 70 to rotate or pivot between an open position, seen in FIG. 11, and a securing position, seen in FIG. 12. When the wire fastening member 50 is in the open position, a bare end of a wire. e.g., wire 500 or 502, can be inserted into the respective wire chamber 42 via wire entry aperture 44. When the wire fastening member 50 is in the securing position, a force is applied to the bare end of the wire such that the wire is pushed, urged or otherwise pressed into contact with the conductive member 52 so that a conductive path is created between the wire 500 or 502 and the conductive member 52.

Figure 11:
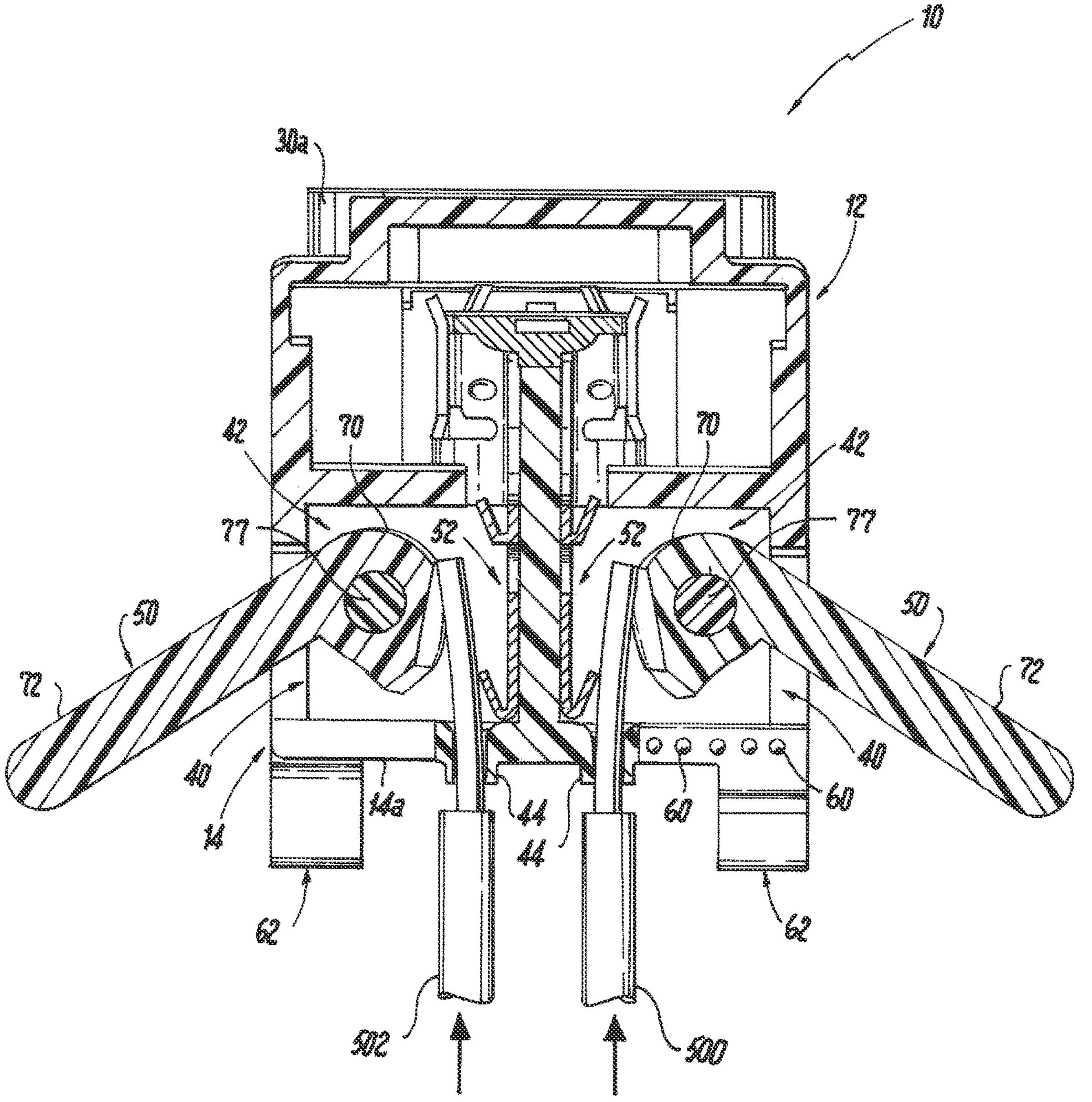
FIG. 11 is a cross-sectional view of the electrical wiring device of FIG. 1 taken along line 11-11, illustrating the wire fastening members in an open position where electrical wires can pass into wire chambers within the electrical wiring device.
Figure 12:
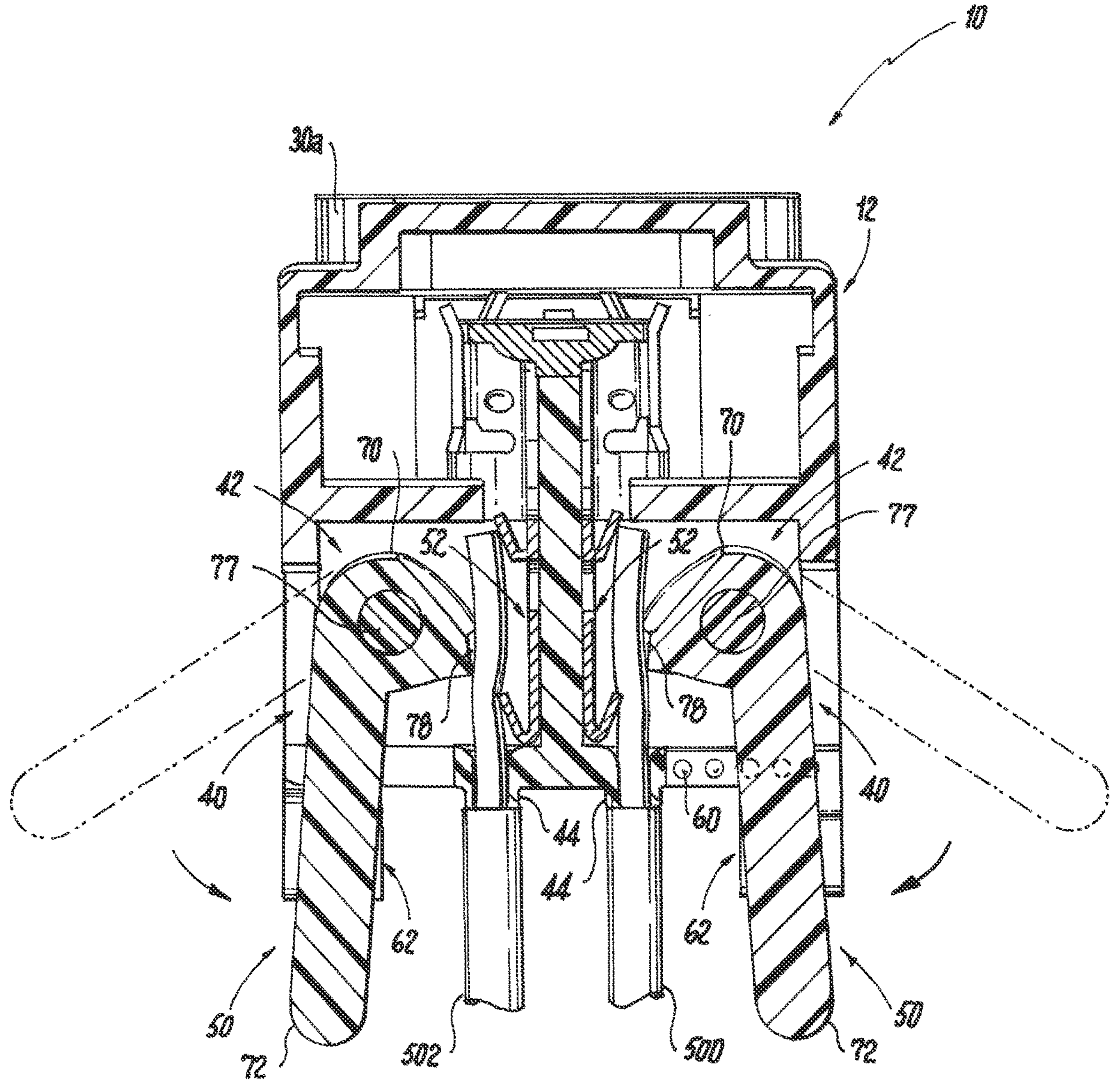
FIG. 12 is a cross-sectional view of the electrical wiring device of FIG. 2 taken along line 12-12, illustrating the wire fastening members in a securing position where the electrical wires within the wire chambers are releasably secured to respective conductive members forming part of the wire termination assemblies.

Referring to FIGS. 5 and 11, the cam body 70 includes one or more concave surfaces 76 that permit a bare end of a wire to pass into the wire chamber 42 when the cam body 70 is in the open position. The cam body 70 also includes one or more wire engaging surfaces 78 that engage the bare end of wires 500 or 502 within the wire chamber 42 when the cam body 70 is in the securing position, as seen in FIGS. 5 and 12 and described in more detail below.

Figure 8:
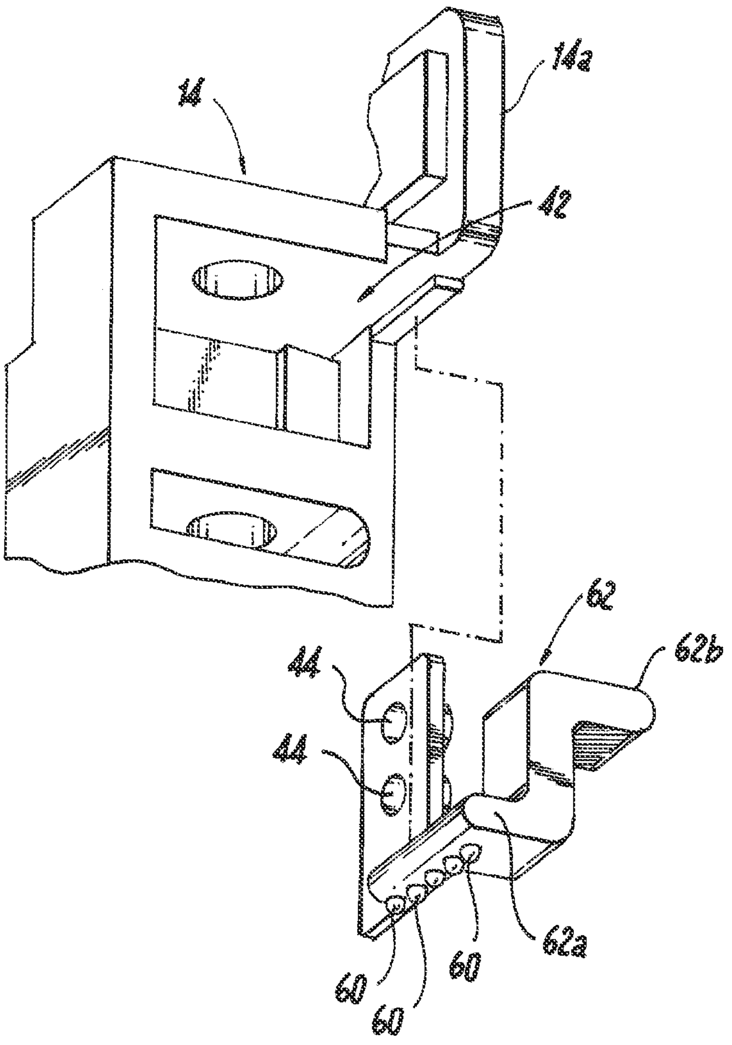
FIG. 8 is a perspective view of a portion of the body of the electrical wiring device taken from detail 8 in FIG. 4, illustrating a locking system according to the present disclosure used to lock the wire fastening members in the securing position.
Figure 9:
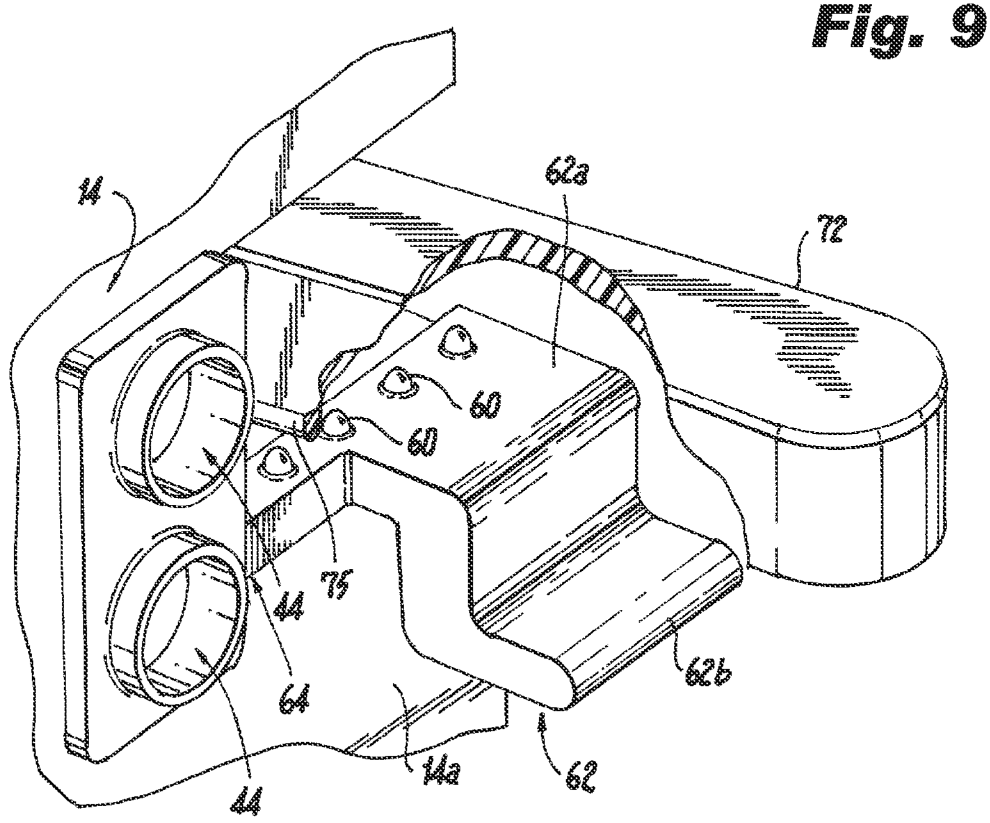
FIG. 9 is a perspective view of the locking system of FIG. 6 of the electrical wiring device of FIG. 2 taken from detail 9, illustrating a wire fastening member partially cut away to reveal detents of the locking system used to lock the wire fastening member of the wire termination assembly in the securing position.
Figure 10:
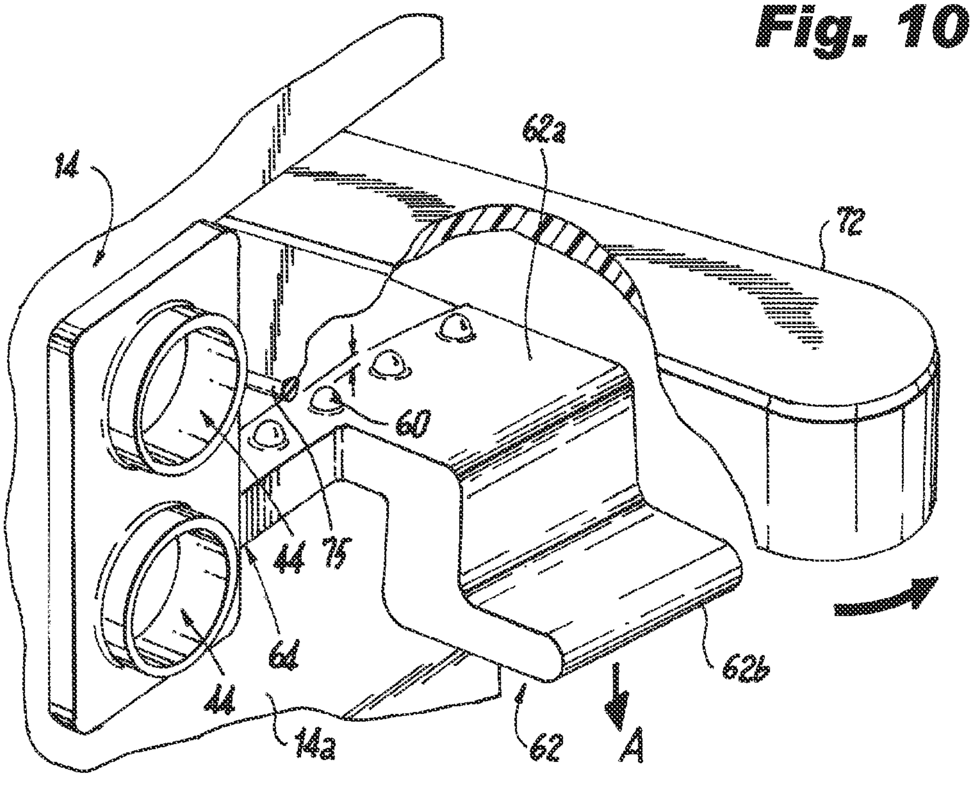
FIG. 10 is a perspective view of the locking system of FIG. 9, illustrating a downward force applied to a locking system to move the detents of the locking system away from the wire fastening member to unlock the locking system permitting the wire fastening member to move to the open position.

Referring to FIGS. 8-10, to lock or hold the wire fastening member 50 in the securing position, an active locking system or passive locking system may be utilized. An exemplary embodiment of an active locking system includes using one or more detents or nubs 60 to releasably hold the lever arm 72 of the wire fastening member 50 in position. For example, a latch bracket 62 may be attached to a portion of the bottom wall **14*a* of the base 14 adjacent a wire chamber 42 by, for example, a living hinge type structure 64. The latch bracket 62 shown in FIG. 8 is a Z-shaped member and the one or more detents 60 extend from one end 62*a* of the latch bracket 62 as shown. When the lever arm 72 is moving toward the securing position, the one or more detents 60 contact an angled, concave, convex or raised surface 75 of the lever arm 72 permitting the lever arm 72 to pass the detents 60 until sufficient force is applied by the wire engaging surfaces 78 of the cam body 70 to the wire in the wire chamber 42 at which point the raised surface 75 of the lever arm 72 rests between two of the detents 60, as seen in FIG. 9. The detents 60 thus lock the lever arm 72 in the securing position. To unlock the locking system, a force is applied to end 62*b* of the latch bracket 62 in the direction of arrow "A," seen in FIG. 10, causing the latch bracket 62 to flex via the living hinge structure 64 releasing the hold of the detents 60 on the lever arm 72**. At this point the lever arm can be rotated to the open position.

Another exemplary embodiment of an active locking system includes using the one or more detents or nubs 60 on the latch bracket 62 and corresponding recesses (not shown) in a surface of the lever arm 72 facing the detents 60 in which the detents can rest. When the lever arm 72 is moving toward the securing position, the one or more detents 60 contact an angled, concave, convex or raised surface 75 of the lever arm 72 permitting the lever arm 72 to pass the detents 60 until sufficient force is applied by the wire engaging surfaces 78 of the cam body 70 to the wire. e.g., wire 500 or 502, in the wire chamber 42. At this point, one or more recesses (not shown) in the lever arm 72 receive one or more of the detents 60 locking the lever arm 72 in the securing position. The locking system could be unlocked in the same manner as described above.

Figure 14:
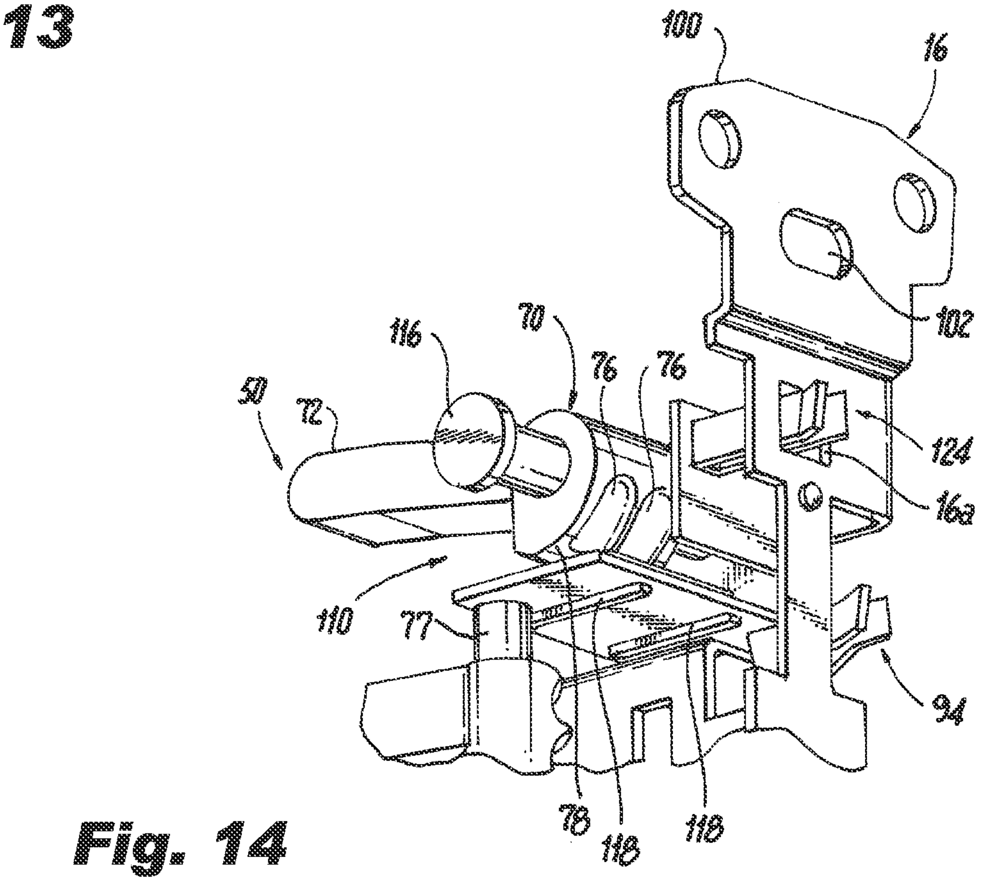
FIG. 14 is another diagrammatic perspective view of the grounding portion the electrical wiring device of FIG. 1 with structure removed revealing a back side of the yoke bracket and the ground conductive member attached to the yoke bracket.

An exemplary embodiment of a passive locking system includes using one or more detents 60 or nubs to create a friction hold. For example, a portion of the bottom wall **14*a* of the base 14 adjacent the ground wire chamber 114, seen in FIGS. 14 and 15 may include the one or more detents or nubs 60 that contact an angled, concave or convex surface 75 of the lever arm 72 when the lever arm is moved toward and is in the securing position creating a friction force therebetween and holding the lever arm 72** in the securing position.

Referring to FIGS. 6 and 7, the conductive member 52 of each wire termination assembly 40 may be a plate or other structure that is made of a material capable of conducting electricity. As non-limiting examples, the conductive member 52 may be made of brass, copper or tin. In this exemplary embodiment, the conductive member 52 includes a plate 80 having one or more barbs 82 extending from the plate and used to grip a wire when the wire fastening member 50 is in the securing position as described below. The conductive members 52 may be separate structures electrically coupled together, or the conductive members 52 may be part of an integral or monolithic contact assembly 90. In an exemplary embodiment shown in FIGS. 6 and 7, the conductive members 52 are part of a contact assembly 90. The contact assembly 90 includes one or more conductive members 52 and one or more binding terminals 94, e.g., female binding terminals. The one or more binding terminals 94 are aligned with the apertures or slots **32*a* and 34*a*, seen in FIG. 1 in a respective plug receiving face 30*a* of the cover 12. The binding terminals 94 are capable of receiving and engaging the prongs of a male plug inserted through the apertures or slots 32*a* and 34*a* in the plug receiving face 30*a* of the cover 12. In this configuration, the one or more conductive members 52 and the one or more binding terminals 94 would be electrically connected such that when the one or more wire fastening members 50 are in the securing position, power from hot and neutral wires 500 and 502 connected to respective conductive members 52 would be available at corresponding female binding terminals 94 to provide power to a plug inserted into the device, e.g., here the receptacle. If the device 10 were a single pole toggle switch, the body 14 would support a switch assembly that includes for example a toggle arm that extends through the cover 12, bumpers, springs and electrical switch contacts that would be electrically connected to the one or more conductive members 52**.

Referring to FIGS. 11-12, the fastening of line (phase) and/or neutral wires 500 and/or 502 to the device 10 will be described. Initially, each wire fastening member 50 is moved to the open position so that bare ends of a wires 500 and/or

502 can be inserted through corresponding wire entry aperture 44 in the body 14 into wire chambers 42 adjacent the wire entry apertures 44. Wires are then inserted through wire entry apertures 44 into the corresponding wire chambers 42. At this point the bare ends of the wires are at least partially within the concave surface 76 of the cam body 70 and between the cam body 70 and the respective conductive member 52, as shown in FIG. 8. The lever arm 72 of each wire fastening member 50 is then moved, e.g., pivoted, to the securing position, as seen in FIG. 9. As the lever arm 72 of each wire fastening member 50 is pivoted, the cam body 70 rotates so that the wire engaging surfaces 78 of the cam body 70 engage the bare end of wires 500 and/or 502 within the wire chamber 42 until the wire fastening member 50 is in the securing position. The lever arm 72 is then held or locked in the securing position using the passive or active locking systems described above.

Referring again to FIGS. 1-4, the yoke 16, which is also referred to as a mounting strap, will be described. In this exemplary embodiment, the yoke 16 extends across an upper surface 14*b* of the body 14, as shown in FIG. 3. The yoke 16 is secured to the body 14 using, for example, a snap-fit connection or mechanical fasteners, such as rivets or other mechanical fasteners. In another exemplary embodiment, shown in FIG. 21, the yoke 16 extends around a perimeter of the base 14. More specifically, the yoke 16 may start adjacent one end of the cover 12 extending along one end of the base 14 around the bottom wall of the base along the other end of the base and ending adjacent the other end of the cover 12. The yoke 16 provides finishing ears 100 and mounting screws 104 that pass through the apertures 102 in the yoke 16. The mounting screws 104 are used to secure the yoke 16 and thus the device 10 to an electrical device box 510 when installed as is known in the art.

Referring now to FIGS. 13-18, the yoke 16 and body 14 support one or more ground wire termination assemblies 110 that provide terminations for ground conductors. Each of the one or more wire termination assemblies 110 includes a wire fastening member 50 (described above) and a conductive member 112, seen in FIG. 16. The wire fastening member 50 is supported by the body and the conductive member 112 is supported by the yoke 16. The wire fastening member 50 and the conductive member 112 are positioned within a ground wire chamber 114 in the base 14, seen in FIGS. 15 and 16.

Figure 13:
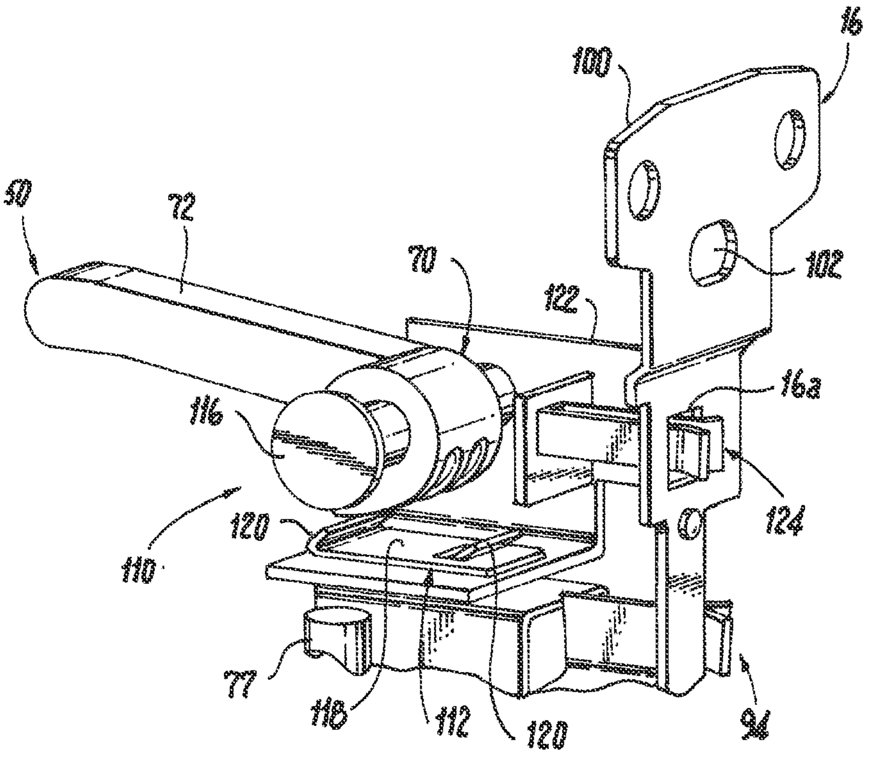
FIG. 13 is a diagrammatic perspective view of a grounding portion the electrical wiring device of FIG. 1 with structure removed to reveal a ground conductive member of a ground wire termination assembly attached to a yoke bracket and a ground wire fastening member of the wire termination assembly.
Figure 15:
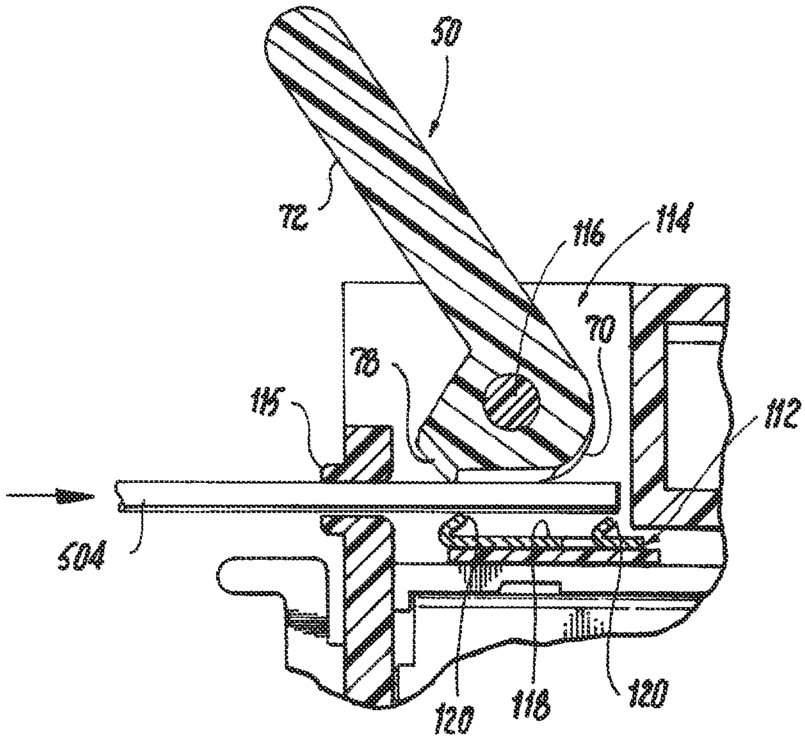
FIG. 15 is a cross-sectional view of the grounding portion of the electrical wiring device of FIG. 1, illustrating a ground wire fastening member of the ground wire termination assembly in an open position where an electrical ground wire can pass into a ground wire chamber within the body.
Figure 16:
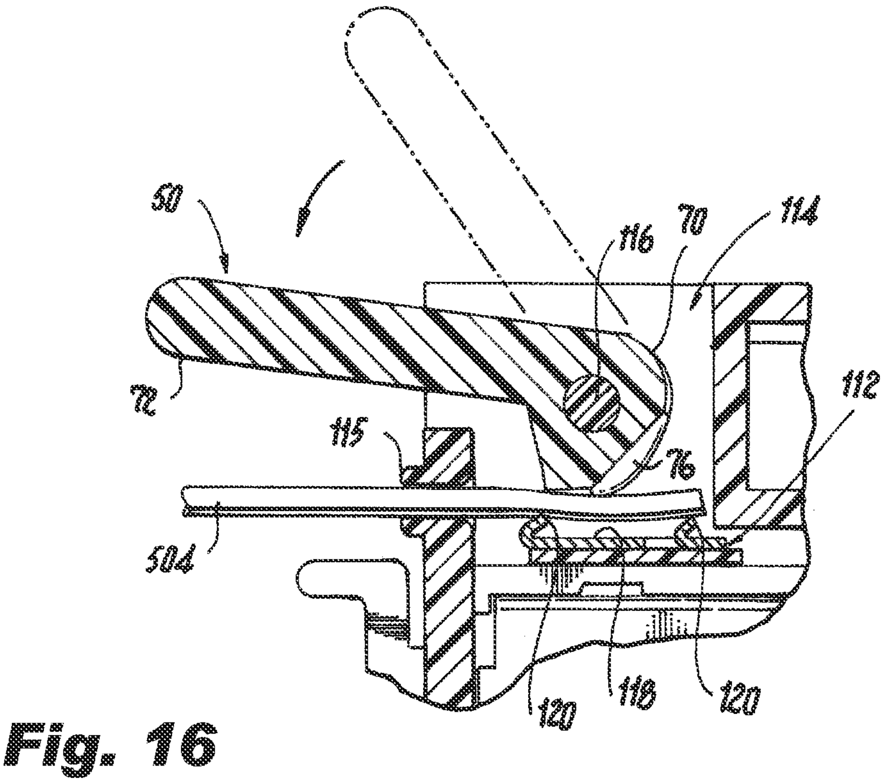
FIG. 16 is a cross-sectional view of the grounding portion of the electrical wiring device of FIG. 15, illustrating the ground wire fastening member rotated to a securing position where the electrical ground wire within the ground wire chamber is releasably secured to the ground conductive member within the ground wire chamber.

In the exemplary embodiment of FIGS. 13-16, the wire fastening member 50 is a cam lever, seen in FIGS. 5 and 13. The wire fastening member 50, e.g., the cam lever, has a cam body 70 and a lever arm 72. The cam body 70 includes a mounting aperture 74 used to mount the wire fastening member 50 within the ground wire chamber 114 so that the cam body 70 can rotate or pivot within the wire chamber 114. More specifically, the mounting aperture 74 receives a mounting pin 116 that extends through the ground wire chamber 114 and a portion of the body 14 to movably secure the wire fastening member 50 within the ground wire chamber 114. In this configuration, the rotating or pivoting of the lever arm 72 causes the cam body 70 to rotate or pivot between an open position, seen in FIG. 15, and a securing position, seen in FIG. 16. When the wire fastening member 50 is in the open position, a bare end of a ground wire 504 can be inserted into the ground wire chamber 114 via a ground wire entry aperture 115. When the wire fastening member 50 is in the securing position, a force is applied to the bare end of the ground wire 504 such that the ground wire 504 is pushed, urged or otherwise pressed into contact with the conductive member 112 so that a conductive path is created between the ground wire 504 and the conductive member 112. More specifically, the cam body 70 includes one or more concave surfaces 76 that permit a bare end of a ground wire 504 to pass into the ground wire chamber 114 when the cam body 70 is in the open position. The cam body 70 also includes one or more wire engaging surfaces 78 that engage the bare end of the ground wires 504 within the ground wire chamber 114 and apply a force to the ground wire 504 when the cam body 70 is in the securing position, as seen in FIGS. 12 and 16.

Referring to FIGS. 17 and 18, to lock or hold the wire fastening member 50 in the securing position, a passive locking system or active locking system described herein may be utilized. An exemplary embodiment of an active locking system includes using one or more detents or nubs 160 to releasably hold the lever arm 72 of the wire fastening member 50 in position. For example, a latch bracket 162 may be attached to a portion of the bottom wall 14*a* of the base 14 adjacent a wire chamber 114 by, for example, a living hinge type structure 164. The latch bracket 162 shown in FIGS. 17 and 18 is a Z-shaped member and the one or more detents 160 extend from one end 162*a* of the latch bracket 162 as shown. When the lever arm 72 is moving toward the securing position, the one or more detents 160 contact an angled, concave, convex or raised surface 75 of the lever arm 72 permitting the lever arm 72 to pass the detents 160 until sufficient force is applied by the wire engaging surfaces 78 of the cam body 70 to the wire in the wire chamber 114 at which point the surface 75 of the lever arm 72 rests between two of the detents 160, as seen in FIG. 18. The detents 160 thus lock the lever arm 72 in the securing position. To unlock the locking system, a force is applied to end 162*b* of the latch bracket 162 in the direction of arrow “B” causing the latch bracket 162 to flex via the living hinge structure 164 releasing the hold of the detents 160 on the lever arm 72. At this point the lever arm 72 can be rotated to the open position.

Referring to FIGS. 15 and 16, the conductive member 112 of each ground wire termination assemblies 110 may be a plate or other structure that is made of a material capable of conducting electricity. As non-limiting examples, the conductive member 112 may be made of brass, copper or tin. In this exemplary embodiment, the conductive member 112 includes a plate 118 having one or more barbs 120 extending from the plate 118 and used to grip ground wires 504 when the wire fastening member 50 is in the securing position, as described below. The one or more conductive members 112 may be separate structures that are electrically coupled to the yoke 16, or the conductive members 112 may be integrally or monolithically formed into the yoke 16. In the exemplary embodiment shown in FIGS. 13 and 14, the conductive members 112 are separate structures secured to a ground bracket 122 that is secured to the yoke 16 or integrally or monolithically formed into the yoke 16. The yoke 16 also includes one or more binding terminals 124, e.g., female binding terminals. The one or more ground binding terminals 124 are aligned with the apertures or slots 16*a* and 16*b* in the yoke 16 which are aligned with the ground aperture 36*a* or 36*b* in a respective plug receiving face 30*a* or 30*b* of the cover 12. The ground binding terminals 124 are capable of receiving and engaging the ground prongs of a male plug inserted through the apertures or slots 36*a* and 36*b* in the plug receiving face 30*a* or 30*b* of the cover 12. In this configuration, the one or more conductive members 112 and the one or more binding terminals 124 would be electrically connected such that when the one or more wire fastening members 50 are in the securing position, the yoke 16 is electrically connected to the ground wires 504 and the ground wires 504 are electrically connected to ground plugs inserted into the device 10, e.g., here the duplex receptacle.

Referring to FIGS. 15 and 16, the fastening of ground wires 504 to the device 10 will be described. Initially, each wire fastening member 50 is moved to the open position so that bare ends of a ground wire 504 can be inserted through corresponding ground wire 504 entry aperture 115 in the body 14 into the ground wire chamber 114, as seen in FIG. 15. A ground wire 504 is then inserted through a ground wire entry aperture 115 into the ground wire chamber 114. At this point, the bare ends of the ground wires 504 are at least partially within the concave surface 76 of the cam body 70 and between the cam body 70 and the conductive member 112, as shown in FIG. 15. The lever arm 72 of each wire fastening member 50 is then moved, e.g., rotated, to the securing position, as seen in FIG. 16. As the lever arm 72 is rotated, the cam body 70 rotates so that the wire engaging surfaces 78 of the cam body 70 engage the bare end of ground wires within the wire chamber 114 until the wire fastening member 50 is in the securing position. The lever arm 72 is then held or locked in the securing position using the passive or active locking systems described above. When the wire fastening member 50 is in the securing position, the bare end of the ground wire 504 is pushed, urged or otherwise pressed into contact with the conductive member 112 so that a conductive path is created between the wire and the conductive member.

Turning now to FIGS. 19-27, another exemplary embodiment of a device according to the present disclosure is shown. In this exemplary embodiment, the device 200 is a duplex receptacle. The device 200 includes a cover 212, a base 214 and a yoke 216. The cover 212 includes a front surface 220, side walls 222 and 224 and end walls 226 and 228 that form an open central interior portion configured to cover or receive the internal components of the device 200 attached to the base 214. The front surface 220 in this exemplary embodiment includes a first plug receiving face 230*a* having apertures or slots 232*a* and 234*a* configured to receive the blades of a first plug, and a ground aperture 236*a* configured to receive the ground prong of the first plug. The front surface 220 also includes a second plug receiving face 230*b* having apertures or slots 232*b* and 234*b* configured to receive the blades of a second plug, and a ground aperture 236*b* configured to receive the ground prong of the second plug.

In this exemplary embodiment the cover 212 and the yoke 216 are secured to the base 214. The cover 12 may be secured to the base 14 using, for example, one or more snap projections 240, seen in FIG. 21, extending from the side walls 222 and 224 of the cover 212 configured to engage corresponding recesses 242 in the base 214 such that when snap projections 240 are fully inserted into the recesses 242, the cover 212 is at least partially secured the base 214. The yoke 216 may be secured to base using a snap-fit connection. For example, each end of the base 214 may include a snap projection 244 and each end of the yoke 216 may include an aperture 246 configured to receive the snap projection 244.

Figure 20:
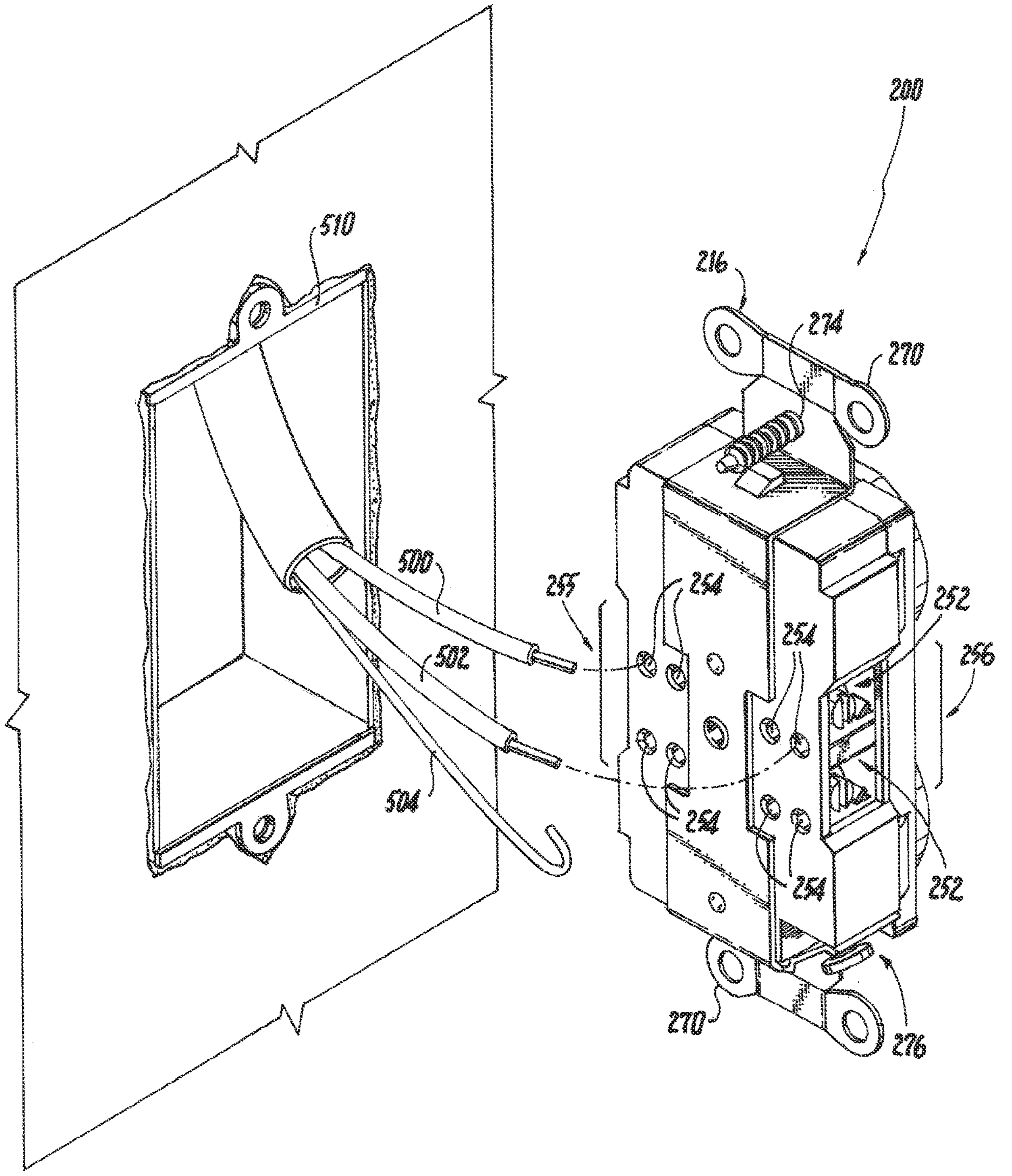
FIG. 20 is a rear perspective view of the electrical wiring device of FIG. 19, illustrating the electrical wires within the electrical wiring device and releasably secured to wire termination assemblies.

Referring to FIGS. 20-23, the base 214 is configured and dimensioned to support one or more wire terminal assemblies 250 that provide terminations for wires providing electrical power to the device 200. Each of the one or more wire termination assemblies 250 is positioned within a wire chamber 252 in the base 214. A bottom wall 214*a* of the base 214 adjacent each wire chamber 252 includes one or more wire entry apertures 254 through which a wire can pass from an exterior of the device 200 into a wire chamber 252, as seen in FIG. 20. Each wire termination assembly 250 includes a wire fastening member 260 and a conductive member 280 positioned within a wire chamber 252, seen in FIG. 23. According to the exemplary embodiment of FIG. 21, the device 200 is a duplex receptacle having four wire termination assemblies 250 and four wire chambers 252. Two of the four wire termination assemblies 250 are line termination assemblies 255 used to terminate one or more line (or phase) wires 500, seen in FIG. 22, and two of the four wire termination assemblies 250 are neutral termination assemblies 256 used to terminate one or more neutral wires 502, seen in FIG. 20. If the device 200 were a single receptacle, the one or more wire termination assemblies 250 may include two wire termination assemblies. In such an embodiment, one of the two wire termination assemblies 250 may be a line termination assembly 255 used to terminate one or more line (or phase) wires 500, and one of the two wire termination assemblies 250 may be a neutral termination assembly 256 used to terminate one or more neutral wires 502. If the device 200 were a single pole toggle switch, the one or more wire termination assemblies 250 may include two wire termination assemblies. In such an embodiment, one of the two wire termination assemblies 250 may be a first line termination assembly 255 used to terminate one or more line or phase wires 500, and one of the two wire termination assemblies 250 may be a second line termination assembly 255 used to terminate one or more switch leg wires (not shown).

Figure 24:
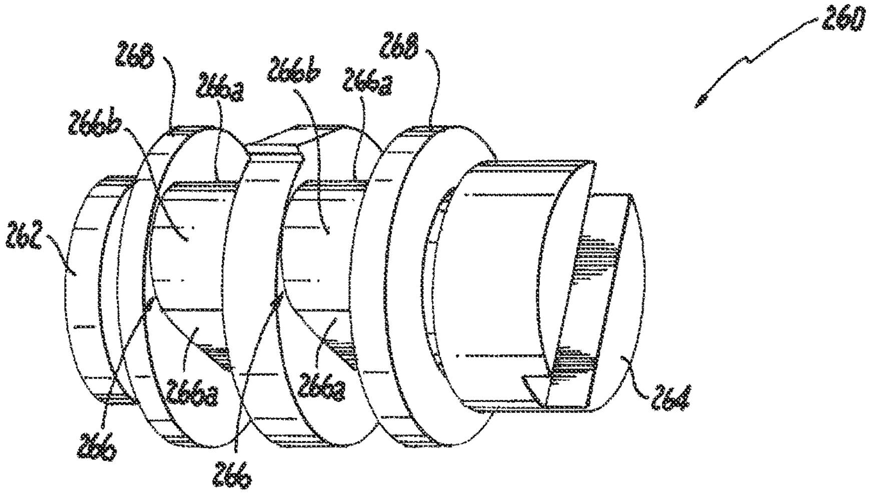
FIG. 24 is a side perspective view of a wire fastening member of a wire termination assembly of FIG. 23, illustrating a cam screw having a plurality of cams used to releasably secure one or more electrical wires to the conductive member and a plurality of guide plates separating the cams.
Figure 25:
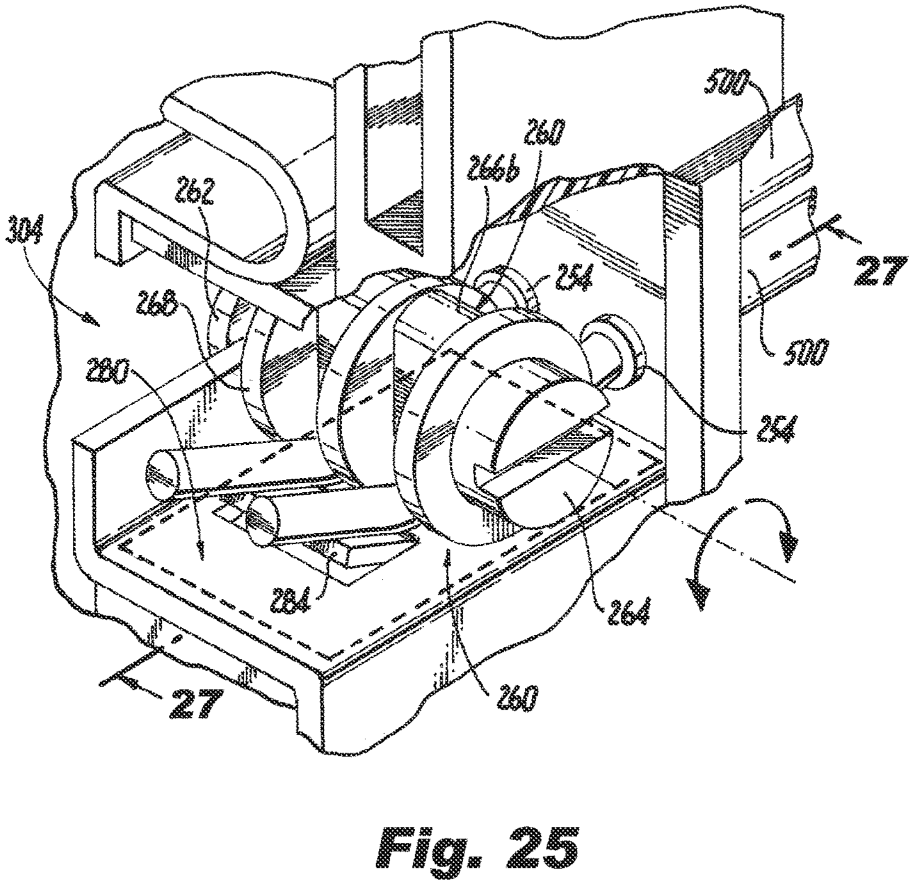
FIG. 25 is a perspective view of a portion of the body of the electrical wiring device of FIG. 21, illustrating multiple electrical wires positioned within a wire chamber in the body and a wire fastening member in a securing position releasably securing the electrical wires to the wire termination assembly so that the wires are in contact with the conductive member.

As noted above, each wire termination assembly 250 includes a wire fastening member 260 and a conductive member 280 positioned within a wire chamber 252 in the base 214, seen in FIGS. 22-24. In this exemplary embodiment, the wire fastening member 260 is a cam screw. The cam screw 260 has a cam shaft 262 having a head 264. The cam shaft 262 includes one or more cams 266 with a guide plate 268 on each side of the cams 266. The guide plates 268 help to align wires inserted in the respective wire chamber 252 between the respective conductive member 280 and the cam 266 acting a wire engaging surface. The cam shaft 262 may be rotatably mounted to the conductive member 280 or to the body 214 so that the cam shaft 262 can rotate or pivot within the wire chamber 252. In this configuration, the rotating or pivoting of the cam shaft head 264 causes the cam shaft 262 to rotate or pivot between an open position, seen in FIG. 26, and a securing position, seen in FIG. 27. When the wire fastening member 260 is in the open position a bare end of a wire, e.g., wire 500, can be inserted into the respective wire chamber 252. When the wire fastening member 260 is in the securing position, a force is applied to the bare end of the wire, e.g., wire 500 or 502, such that the wire is pushed, urged or otherwise pressed into contact with the conductive member 280 so that a conductive path is created between the wire 500 or 502 and the conductive member 280.

Figure 26:
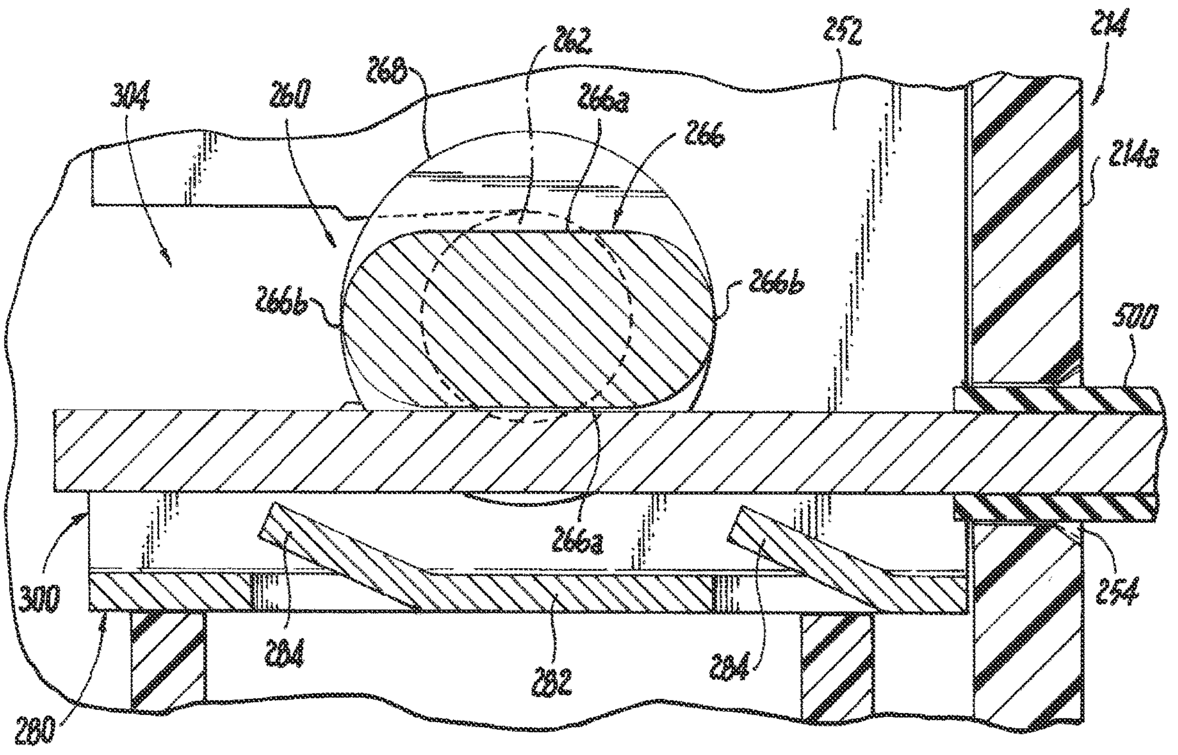
FIG. 26 is a cross-sectional view of a portion of the body of the electrical wiring device of FIG. 22 taken from line 26-26, and illustrating a wire inserted into a wire chamber within the body and the wire fastening member in an open position.

The cams 266 may come in different shapes and sizes sufficient to apply a force sufficient to urge, push or otherwise press against a wire, e.g., wire 500 or 502, when the wire fastening member 260 is in the securing position, as described below. The cams 266 may be integrally or monolithically formed into the cam shaft 262 or the cams 266 may be separate members attached to the cam shaft. In one exemplary embodiment, seen in FIG. 24, the cams 266 include two flat side surfaces 266*a* and rounded or blunt end surfaces 266*b*. The side surfaces 266*a* permit a bare end of a wire to pass into the wire chamber 252 when the wire fastening member 260 is in the open position, as seen in FIG. 26. The end surfaces 266*b* are configured to engage the bare end of wires within the wire chamber 252 when the wire fastening member 260 is in the securing position, as seen in FIG. 27.

Referring again to FIG. 23, the conductive member 280 of each wire termination assembly 250 may be a plate or other structure that is made of a material capable of conducting electricity. As non-limiting examples, the conductive member 280 may be made of brass, copper or tin. In this exemplary embodiment, the conductive member 280 includes a plate 282 having one or more barbs 284 extending from the plate 282 and used to grip a wire, e.g., wire 500 or 502, when the wire fastening member 260 is in the securing position. The conductive members 280 may be separate structures electrically coupled together, or the conductive members 280 may be part of an integral or monolithic contact assembly 300. In the exemplary embodiment of FIG. 23, the conductive members 280 are part of a contact assembly 300. The contact assembly 300 includes one or more conductive members 280 and one or more binding terminals 302, e.g., female binding terminals. The contact assembly 300 may also include one or more slots 304 used for attaching a wire fastening members 260 to the contact assembly 300. The contact assembly 300 is supported within the body 214 so that one conductive member 280 and one slot 304 are positioned within a wire chamber 252.

Figure 21:
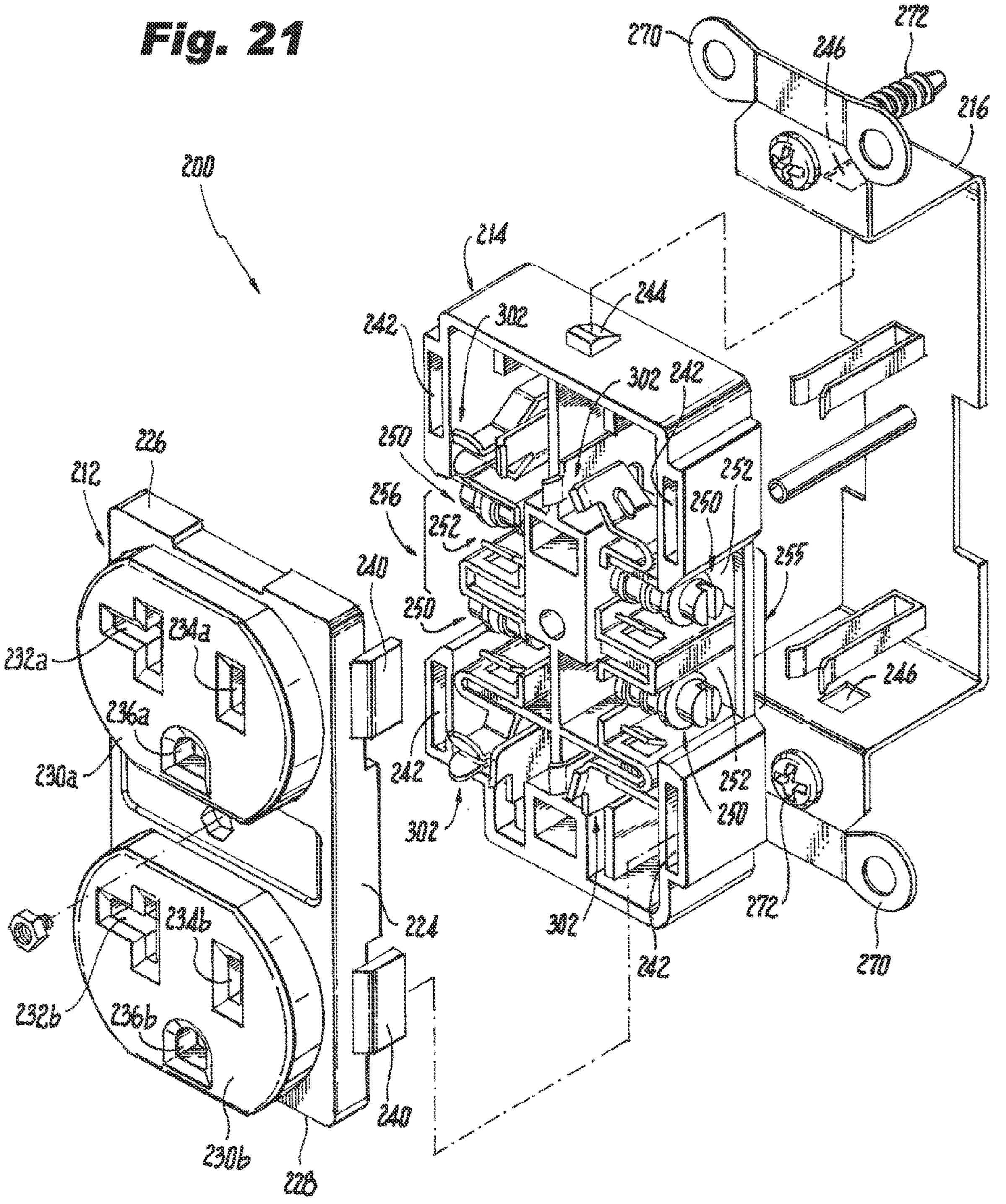
FIG. 21 is an exploded perspective view of a first side of the electrical wiring device of FIG. 19, illustrating a cover separated from a body of the electrical wiring device and a yoke separated from the body, and illustrating multiple wire termination assemblies supported by the body and used to releasably secure the electrical wires to the electrical wiring device.

Referring to FIGS. 21 and 23, the one or more binding terminals 302 are aligned with the apertures or slots 232*a* and 232*b*, or 234*a* and 234*b* in a respective plug receiving face 230*a* or 230*b* of the cover 212. The binding terminals are capable of receiving and engaging the blades of a male plug inserted through the apertures or slots 232*a* or 234*a* in the plug receiving face 230*a* of the cover 212. In this configuration, the one or more conductive members 280 and the one or more binding terminals 302 would be electrically connected, such that when the one or more wire fastening members 260 are in the securing position, power from hot and/or neutral wires, e.g., wires 500 and 502, connected to respective conductive members 280 would be available at corresponding female binding terminals 302 to provide power to a plug inserted into the device 200, e.g., here a duplex receptacle. If the device 200 were a single pole toggle switch, the body 14 would support a switch assembly that includes for example a toggle arm that extends through the cover 212, bumpers, springs and electrical switch contacts that would be electrically connected to the one or more conductive members 280.

Figure 27:
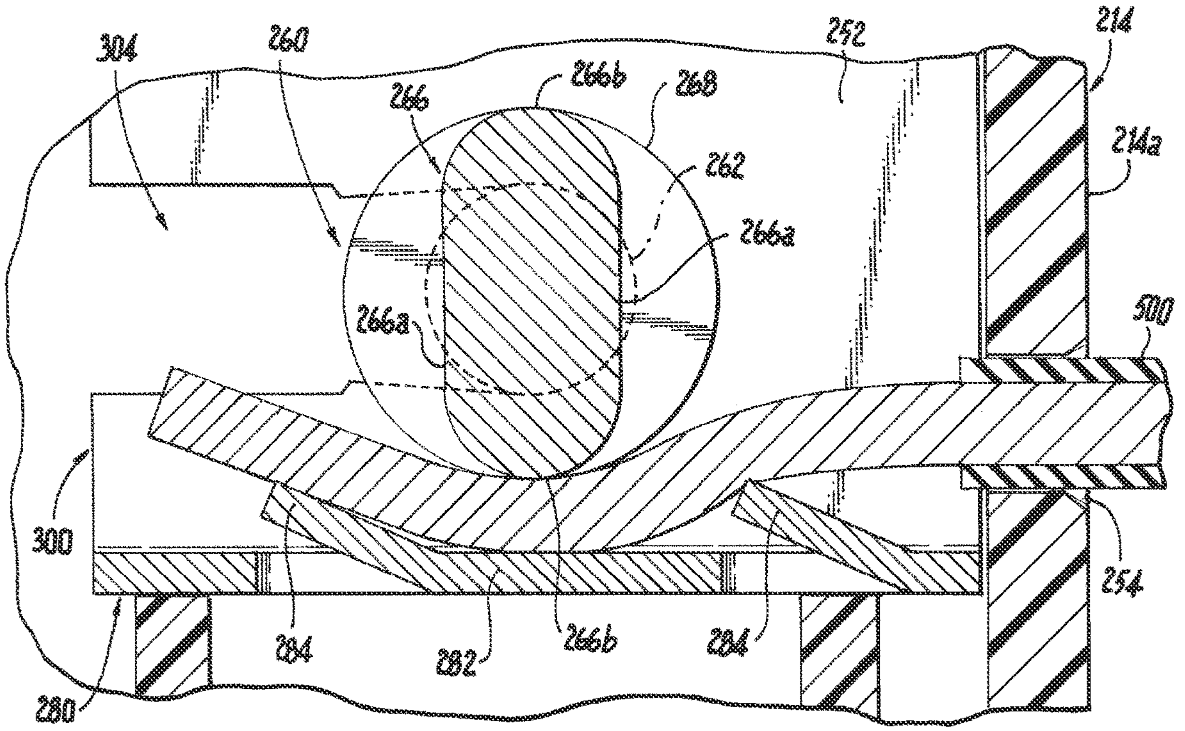
FIG. 27 is a cross-sectional view of a portion of the body of the electrical wiring device of FIG. 25 taken from line 27-27, and illustrating a wire inserted into a wire chamber within the body and a wire fastening member in the securing position releasably securing the electrical wire to the conductive member of the wire termination assembly.

Referring to FIGS. 26 and 27, the fastening of line (phase) and/or neutral wires 500 and/or 504 to the device 200 will be described. Initially, each wire fastening member 260 is moved to the open position so that bare ends of wires, e.g., wires 500 and/or 502, can be inserted through corresponding wire entry apertures 254 in the body 214 into wire chambers 252 adjacent the wire entry apertures 254. Wires, e.g., wires 500 and/or 502, are then inserted through wire entry apertures 254 into the corresponding wire chambers 252. At this point the bare ends of each wire, e.g., wire 500, to be fastened to the device 200 are at least partially within wire chambers 252 and between a flat surface 266*a* of a cam 266 and the respective conductive member 280, as shown in FIG. 26. The head 264 of the cam shaft 262 of each wire fastening member 260 is then moved, e.g., rotated or pivoted, to the securing position, as seen in FIG. 27. As the head 264 of the cam shaft 262 is rotated, the rounded surface 266*b* of the cam 266 rotates so that the rounded surface 266*b* engages the bare end of wires within the wire chamber 252 until the wire fastening member 260 is in the securing position. As noted, when the wire fastening member 260 is in the securing position, a force is applied to the bare end of the wire, e.g., wire 500 or 502, such that the wire is pushed, urged or otherwise pressed into contact with the conductive member 280 so that a conductive path is created between the wire 500 or 502 and the conductive member 280.

Referring again to FIGS. 20 and 21, the yoke 216, which is also referred to as a mounting strap, will be described. In this exemplary embodiment, the yoke 216 extends around a perimeter of the base 214. More specifically, the yoke 216 is a U-shape like member that wraps around an out perimeter of the base 214 as is known. The yoke 216 provides finishing 20) ears 270 and mounting screws 272 that pass through the apertures 274 in the yoke 216. The mounting screws 272 are used to secure the yoke 216 and thus the device 200 to an electrical device box 510 when installed as is known in the art. The yoke 216 also supports a ground wire termination 276, which in this exemplary embodiment is a set screw attached to a mounting plate as is known. In another exemplary embodiment, the ground wire termination 276 may include one or more ground wire termination assemblies that are similar to the ground wire termination assemblies 110 described above, and the body 214 would include a corresponding ground wire chamber similar to the ground wire chamber 114 described above. In another exemplary embodiment, the ground wire termination 276 may include one or more of the wire termination assemblies 250 described above.

Figure 19:
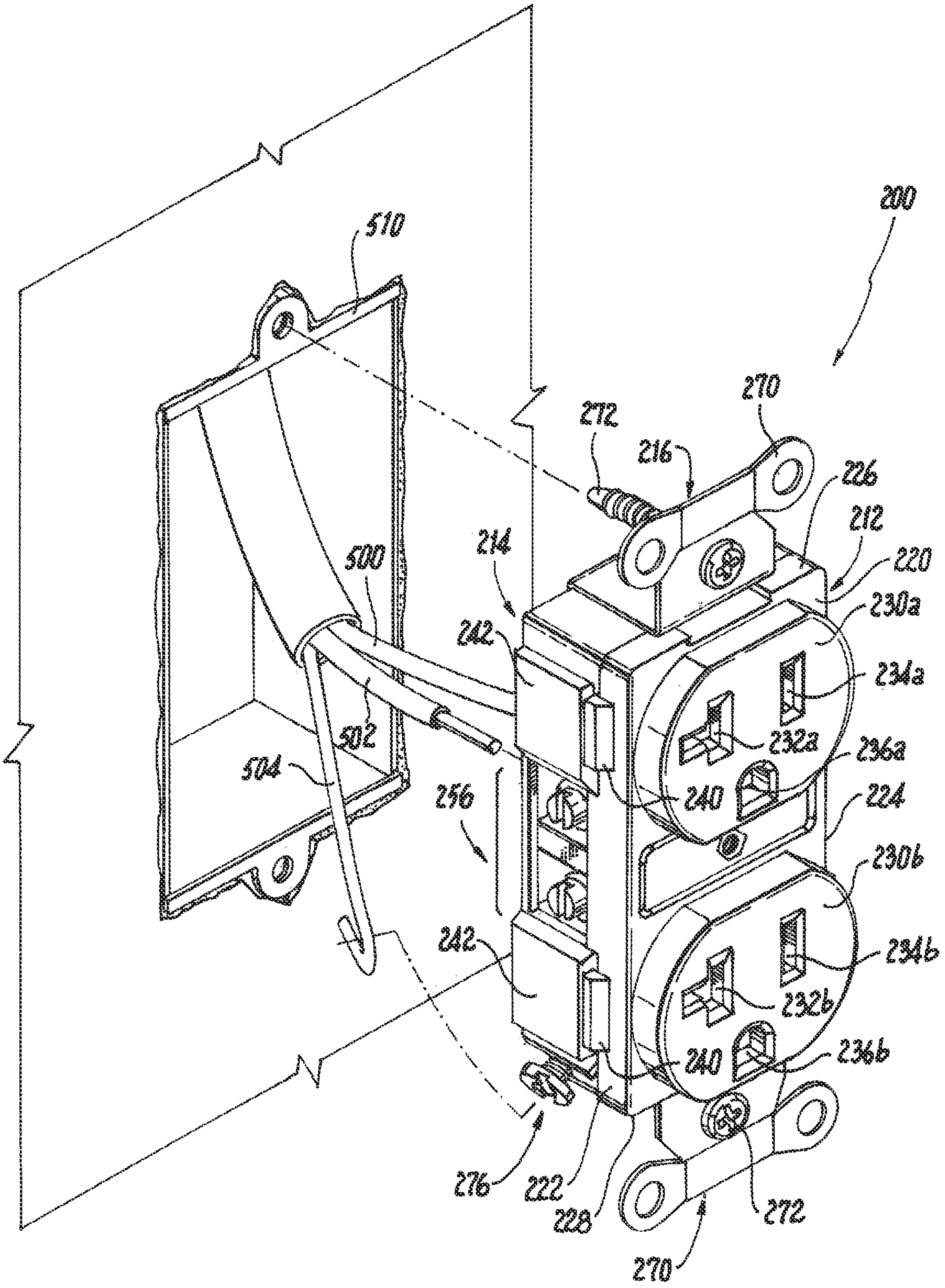
FIG. 19 is a front perspective view of another exemplary embodiment of an electrical wiring device according to the present disclosure positioned for connection to electrical wires within an electrical box, and illustrating wire fastening members of multiple wire termination assemblies used to releasably secure the electrical wires to the wire termination assemblies.

Turning now to FIGS. 28-31, another exemplary embodiment of wire termination assembly that can be used with the device 200 of FIGS. 19-21 are shown. In this exemplary embodiment, each wire termination assembly 250 includes a wire fastening member 260, which is described above and for ease of description is not repeated, and a conductive member 360. Each conductive member 360 of each wire termination assembly 350 may be a plate or other structure that is made of a material capable of conducting electricity. As non-limiting examples, the conductive member 360 may be made of brass, copper or tin. In this exemplary embodiment, the conductive member 360 includes a plate 362 having a pocket 364 used to grip a wire, e.g., wire 500 or 502, when the wire fastening member 260 is in the securing position. The conductive members 360 may be separate structures electrically coupled together, or the conductive members 360 may be part of an integral or monolithic contact assembly 400. In the exemplary embodiment of FIG. 28, the conductive members 360 are part of a contact assembly 400. The contact assembly 400 includes one or more conductive members 360 and one or more binding terminals 402, e.g., female binding terminals. The contact assembly 400 may also include one or more slots 404 used for attaching a wire fastening members 260 to the contact assembly 400. The contact assembly 400 is supported within the body 214 so that one conductive member 360 and one slot 404 are positioned within a wire chamber 252.

Figure 28:
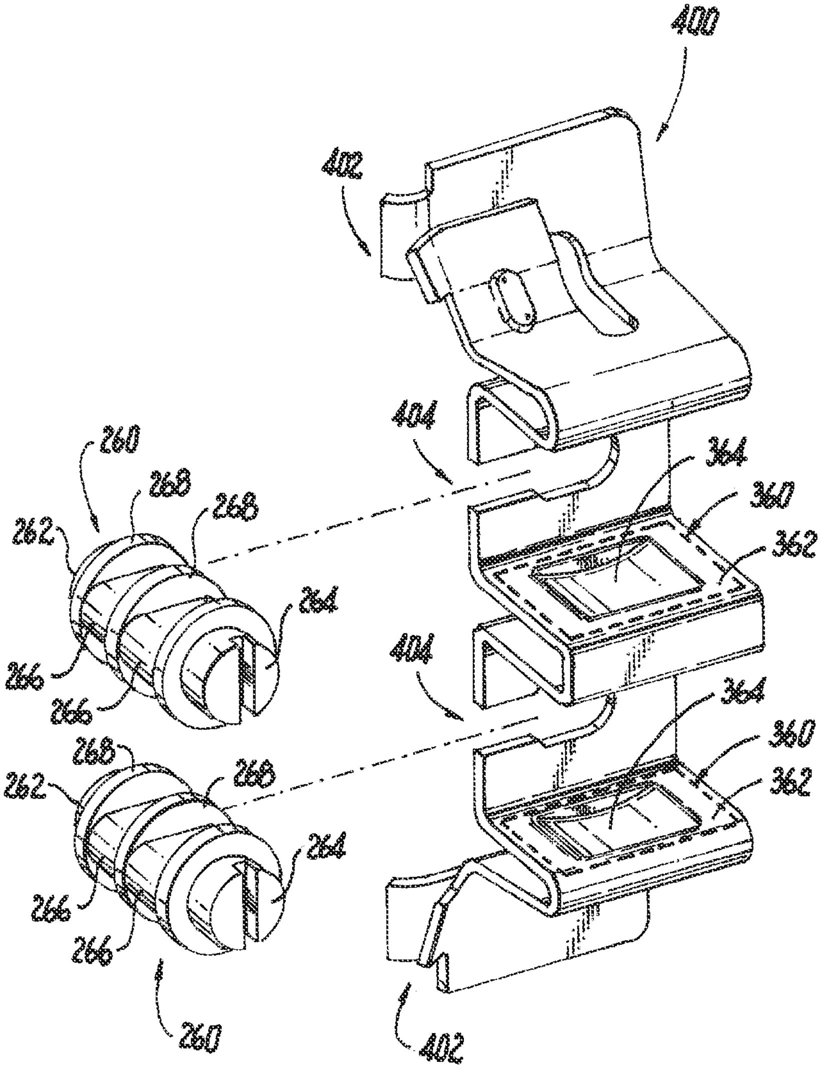
FIG. 28 is a perspective of another exemplary embodiment of multiple wire termination assemblies according to the present disclosure, each wire termination assembly including a conductive member and a wire fastening member that can be used with the electrical wiring device of FIG. 17.
Figure 29:
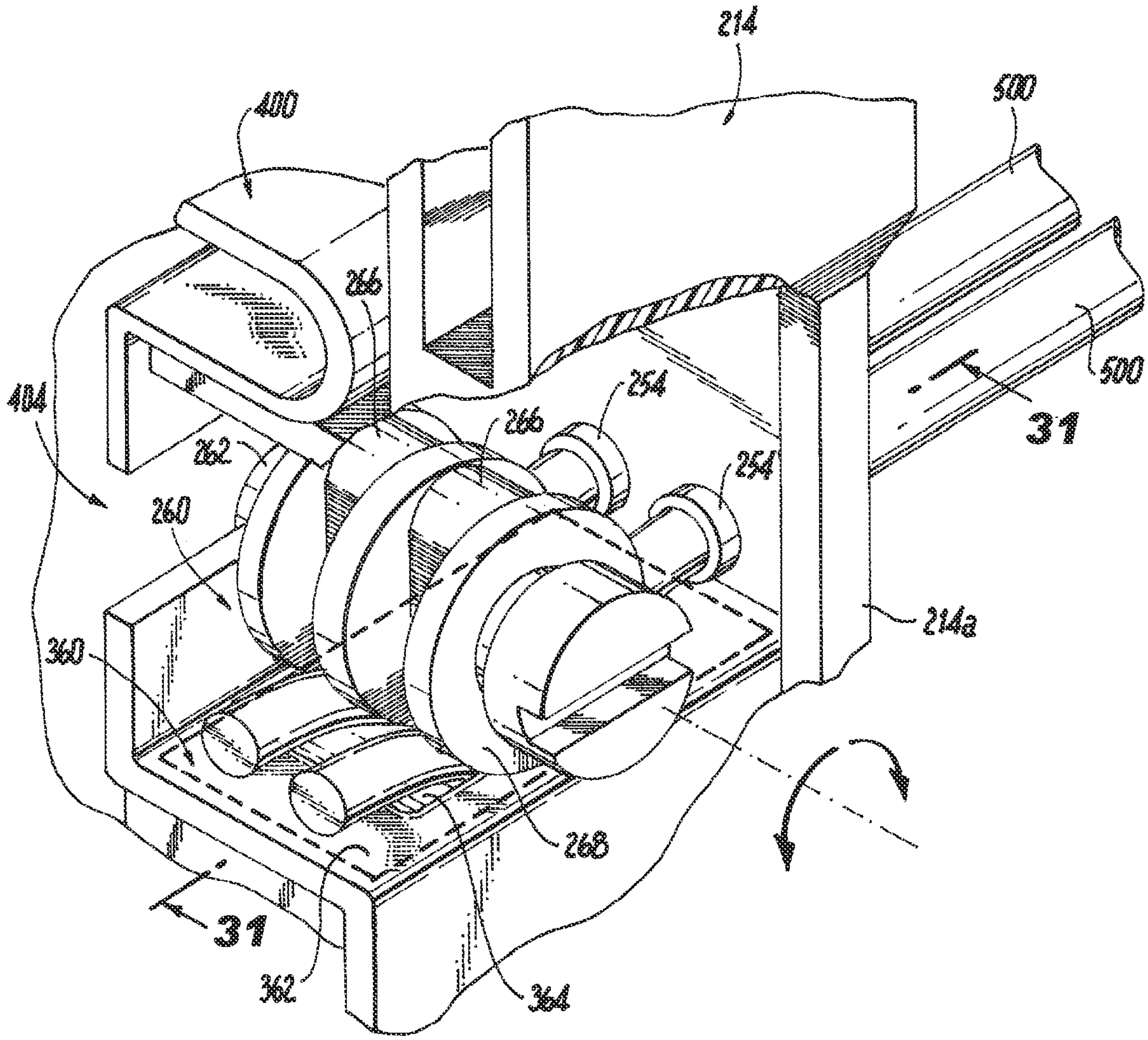
FIG. 29 is a perspective view of a portion of the body of the electrical wiring device of FIG. 21 using a wire termination assembly of FIG. 28, illustrating multiple electrical wires positioned with a wire chamber in the body and the wire fastening member in a securing position releasably securing the electrical wires within the body so that the wires are in contact with the conductive member.

Referring to FIGS. 21 and 28, the one or more binding terminals 402 are aligned with the apertures or slots 232*a* and 232*b*, or 234*a* and 234*b* in a respective plug receiving face 230*a* or 230*b* of the cover 212. The binding terminals are capable of receiving and engaging the blades of a male plug inserted through the apertures or slots 232*a* or 234*a* in the plug receiving face 230*a* of the cover 212. In this configuration, the one or more conductive members 360 and the one or more binding terminals 402 would be electrically connected such that when the one or more wire fastening members 260 are in the securing position, power from hot and/or neutral wires, e.g., wires 500 and 502, connected to respective conductive members 360 would be available at corresponding female binding terminals 402 to provide power to a plug inserted into the device 200, e.g., here a duplex receptacle. If the device 200 were a single pole toggle switch, the body 14 would support a switch assembly that includes for example a toggle arm that extends through the cover 212, bumpers, springs and electrical switch contacts that would be electrically connected to the one or more conductive members 360.

Figure 30:
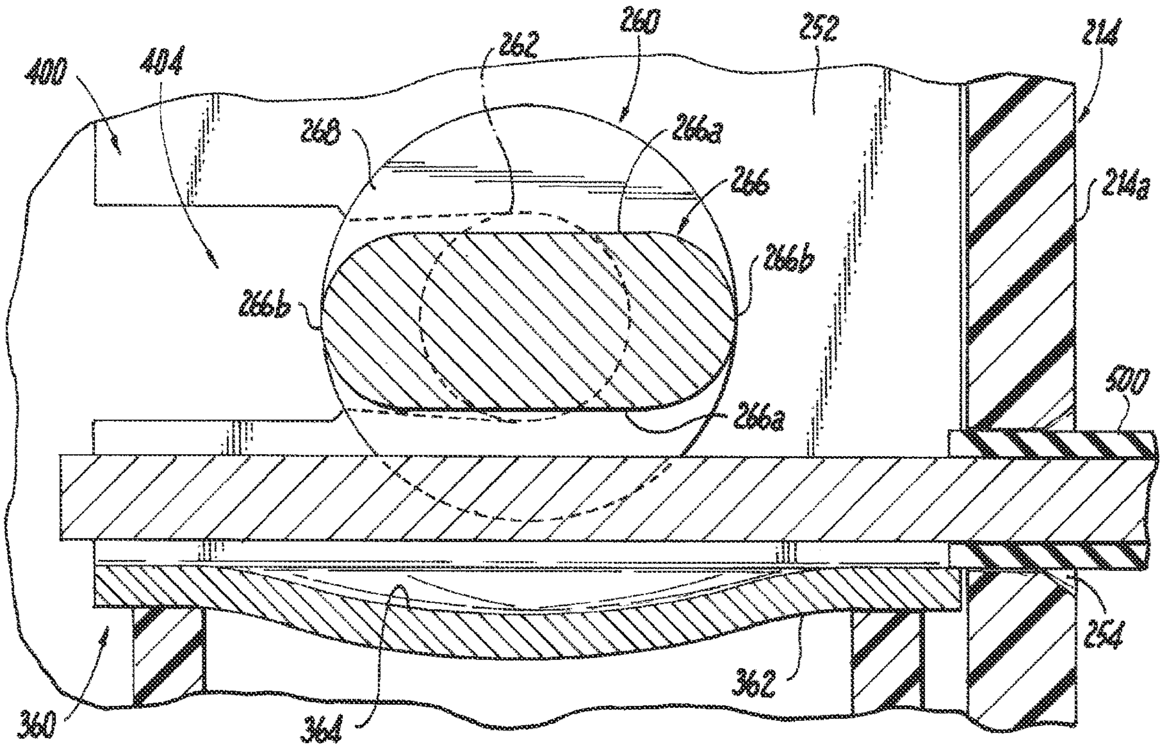
FIG. 30 is a cross-sectional view of a portion of the body of the electrical wiring device of FIG. 21 similar to FIG. 26, and illustrating a wire inserted into a wire chamber within the body and the wire fastening member of the wire termination assembly in an open position.
Figure 31:
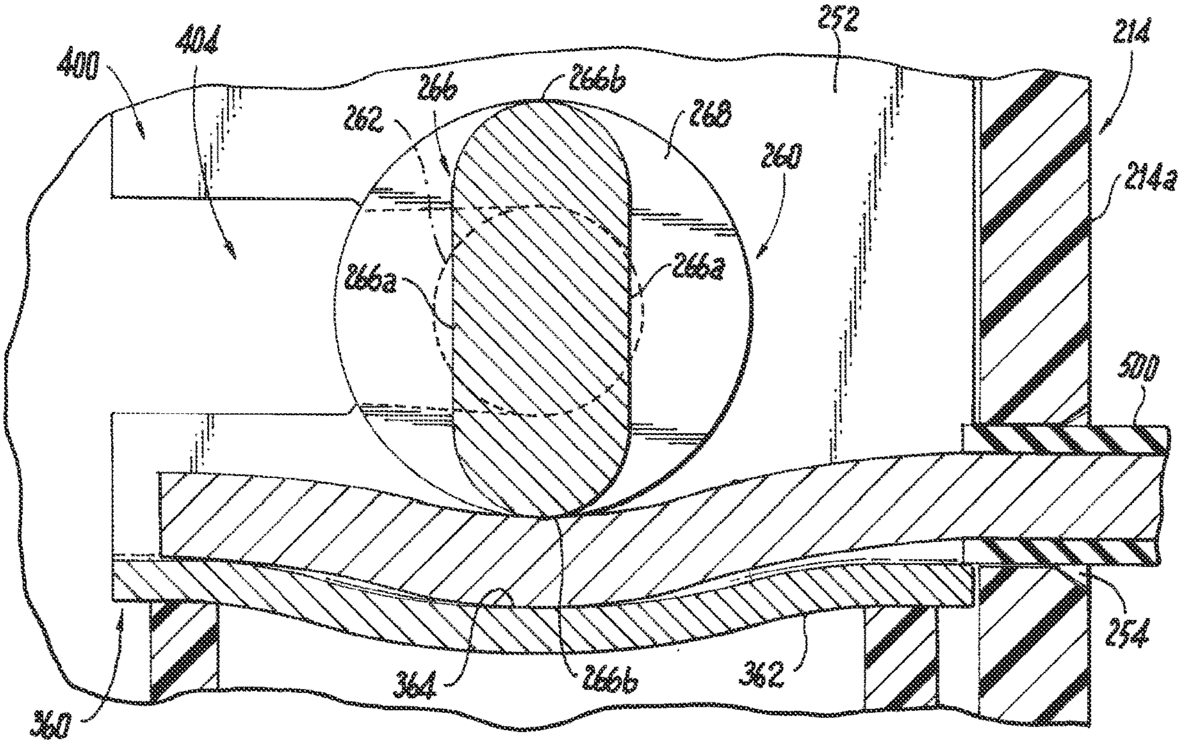
FIG. 31 is a cross-sectional view of the portion of the body of the electrical wiring device of FIG. 29 taken from line 31-31, and illustrating a wire inserted into a wire chamber within the body and the wire fastening member of the wire termination assembly in the securing position releasably securing the electrical wire to the conductive member of the wire termination assembly.

Referring to FIGS. 30 and 31, the fastening of line (phase) wire 500 and/or neutral wires 502 to the device 200 will be described. Initially, each wire fastening member 260 is moved to the open position so that bare ends of wires, e.g., wires 500 and/or 502, can be inserted through corresponding wire entry apertures 254 in the body 214 into wire chambers 252 adjacent the wire entry apertures 254. Wires, e.g., wires 500 and/or 502, are then inserted through wire entry apertures 254 into the corresponding wire chambers 252. At this point the bare ends of each wire, e.g., wire 500, to be fastened to the device 200 are at least partially within wire chambers 252 and between a flat surface 266*a* of a cam 266 and the respective conductive member 360, as shown in FIG. 30. The head 264 of the cam shaft 262 of each wire fastening member 260 is then moved, e.g., rotated or pivoted, to the securing position, as seen in FIG. 31. As the head 264 of the cam shaft 262 is rotated, the rounded surface 266*b* of the cam 266 rotates so that the rounded surface 266*b* engages the bare end of wires within the wire chamber 252 until the wire fastening member 260 is in the securing position. As noted, when the wire fastening member 260 is in the securing position, a force is applied to the bare end of the wire, e.g., wire 500 or 502, such that the wire is pushed, urged or otherwise pressed into the pocket 364 of the conductive member 360 so that a conductive path is created between the wire and the conductive member 360.

Turning now to FIGS. 32-36, another exemplary embodiment of wire termination assembly that can be used with the device 200 of FIGS. 19-21 is shown. In this exemplary embodiment, each wire termination assembly 380 includes a wire fastening member 260 and a conductive member 390. In this exemplary embodiment the wire fastening member 260 is substantially the same as the wire fastening member described except that the rounded surface 266*b* of each cam 266 has a slightly flatter geometry than the rounded surfaces described above. This flatter geometry provides a greater surface area that contacts the wire and is better suited from securing stranded wire to the wire termination assembly 380.

Each conductive member 390 of each wire termination assembly 360 may be a plate or other structure that is made of a material capable of conducting electricity. As non-limiting examples, the conductive member 390 may be made of brass, copper or tin. In this exemplary embodiment, the conductive member 390 includes a flat plate 392 used to grip a stranded wire, e.g., wire 506, when the wire fastening member 260 is in the securing position. The conductive members 390 may be separate structures electrically coupled together, or the conductive members 390 may be part of an integral or monolithic contact assembly 450. In the exemplary embodiment of FIG. 32, the conductive members 390 are part of a contact assembly 450. The contact assembly 450 includes one or more conductive members 390 and one or more binding terminals 452, e.g., female binding terminals. The contact assembly 450 may also include one or more slots 454 used for attaching a wire fastening members 260 to the contact assembly 450. The contact assembly 450 is supported within the body 214 so that one conductive member 390 and one slot 454 are positioned within a wire chamber 252.

Figure 32:
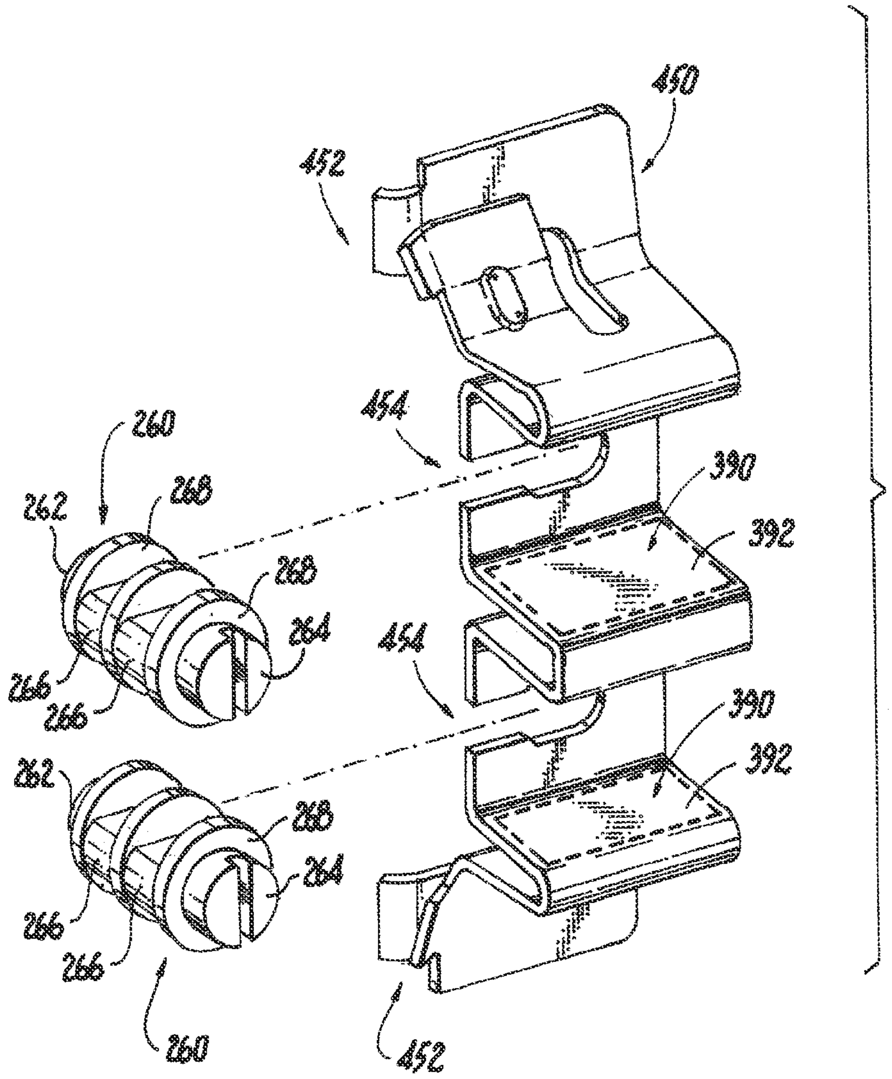
FIG. 32 is a perspective view of another exemplary embodiment of multiple wire termination assemblies according to the present disclosure, each wire termination assembly including a conductive member and a wire fastening member that can be used with the electrical wiring device of FIG. 21.
Figure 33:
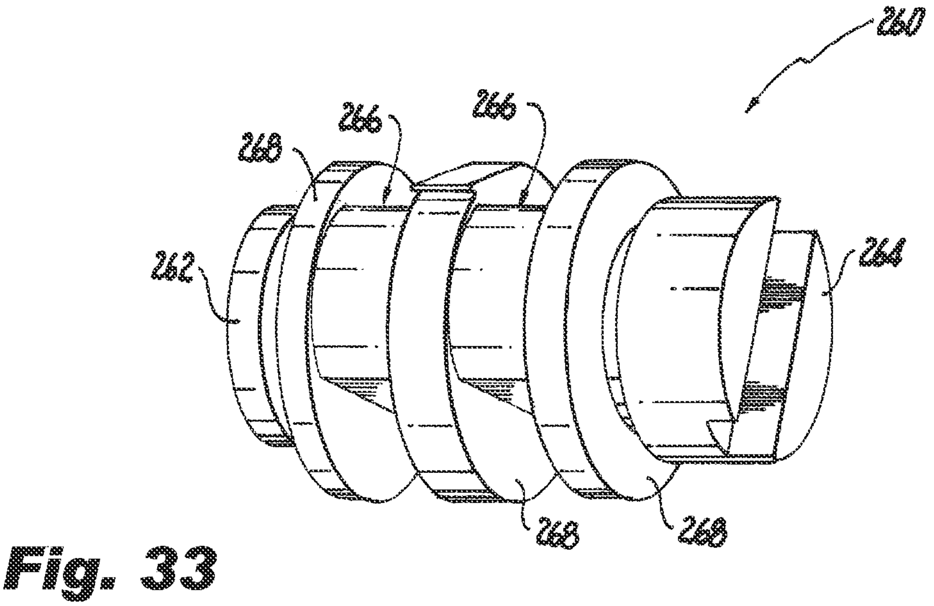
FIG. 33 is a side perspective view of a wire fastening member of a wire termination assembly of FIG. 32, illustrating a cam screw having a plurality of cams used to releasably secure one or more electrical wires to the conductive member and a plurality of guide plates separating the cams.
Figure 34:
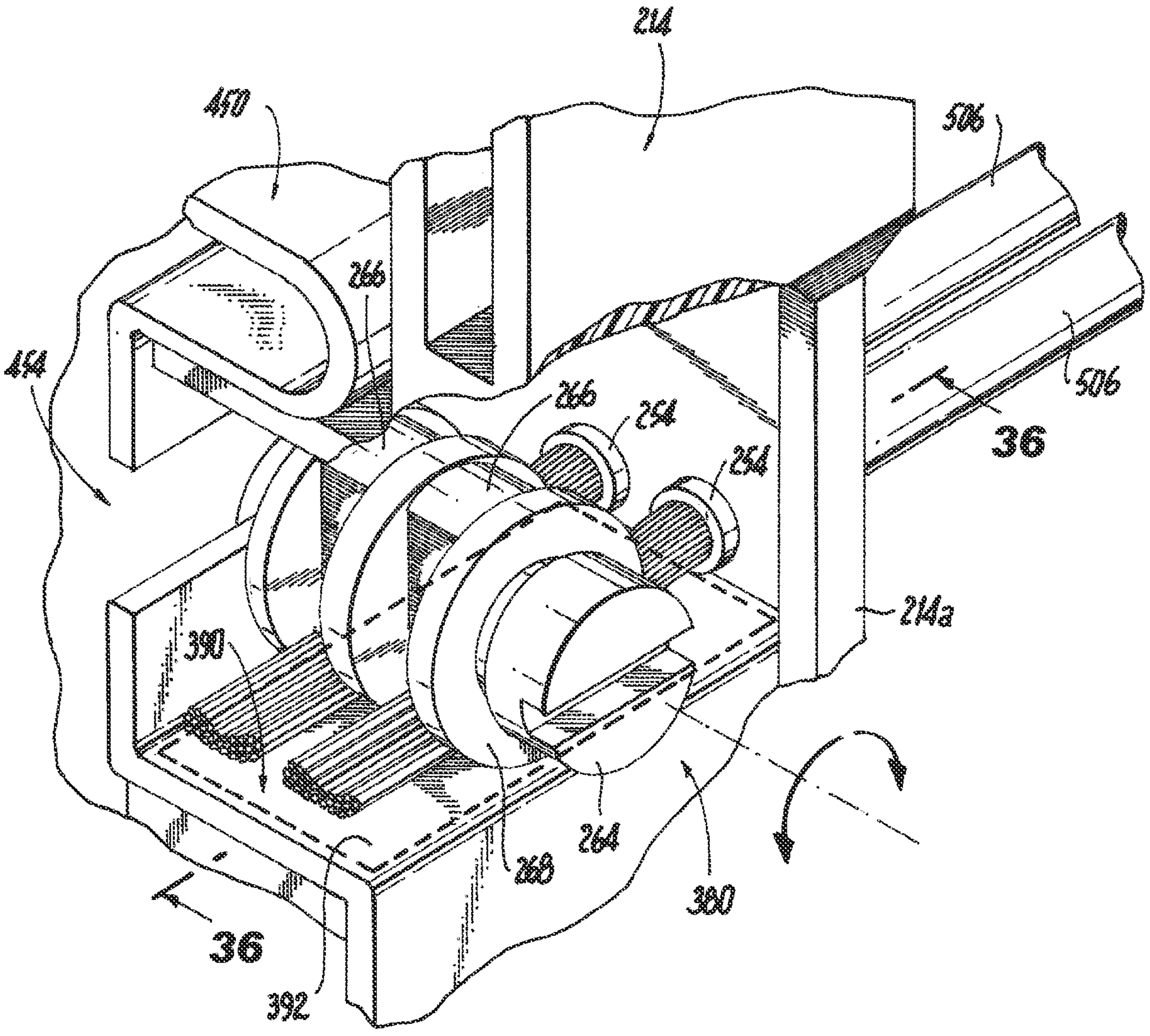
FIG. 34 is a perspective view of a portion of the body of the electrical wiring device of FIG. 21 using a wire termination assembly of FIG. 32, illustrating multiple stranded electrical wires positioned with a wire chamber in the body and the wire fastening member in a securing position releasably securing the stranded electrical wires within the body so that the wires are in contact with the conductive member.

Referring to FIGS. 21 and 32, the one or more binding terminals 452 are aligned with the apertures or slots 232*a* and 232*b*, or 234*a* and 234*b* in a respective plug receiving face 230*a* or 230*b* of the cover 212. The binding terminals are capable of receiving and engaging the blades of a male plug inserted through the apertures or slots 232*a* or 234*a* in the plug receiving face 230*a* of the cover 212. In this configuration, the one or more conductive members 390 and the one or more binding terminals 452 would be electrically connected such that when the one or more wire fastening members 260 are in the securing position, power from hot and/or neutral wires, e.g., stranded wire 506, connected to respective conductive members 390 would be available at corresponding female binding terminals 452 to provide power to a plug inserted into the device 200, e.g., here a duplex receptacle. If the device 200 were a single pole toggle switch, the body 14 would support a switch assembly that includes for example a toggle arm that extends through the cover 212, bumpers, springs and electrical switch contacts that would be electrically connected to the one or more conductive members 390.

Figure 35:
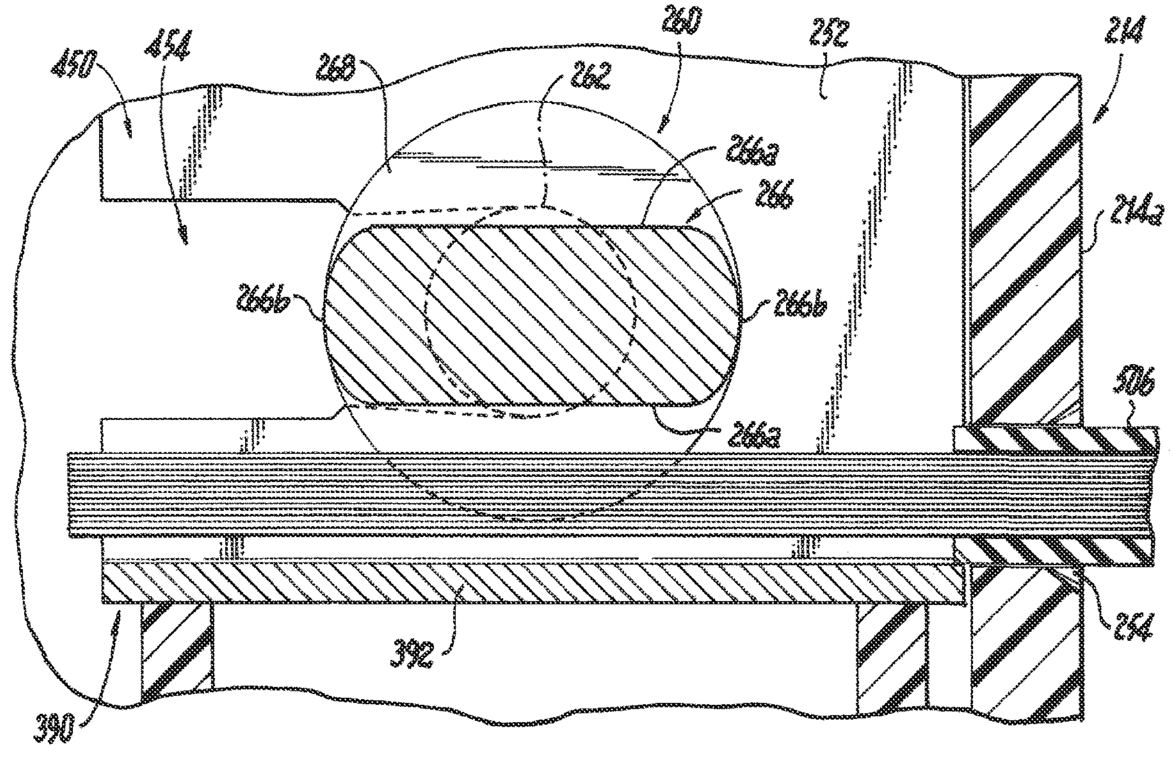
FIG. 35 is a cross-sectional view of the portion of the body of the electrical wiring device of FIG. 34, illustrating a stranded electrical wire inserted into a wire chamber within the body and the wire fastening member of the wire termination assembly in an open position.
Figure 36:
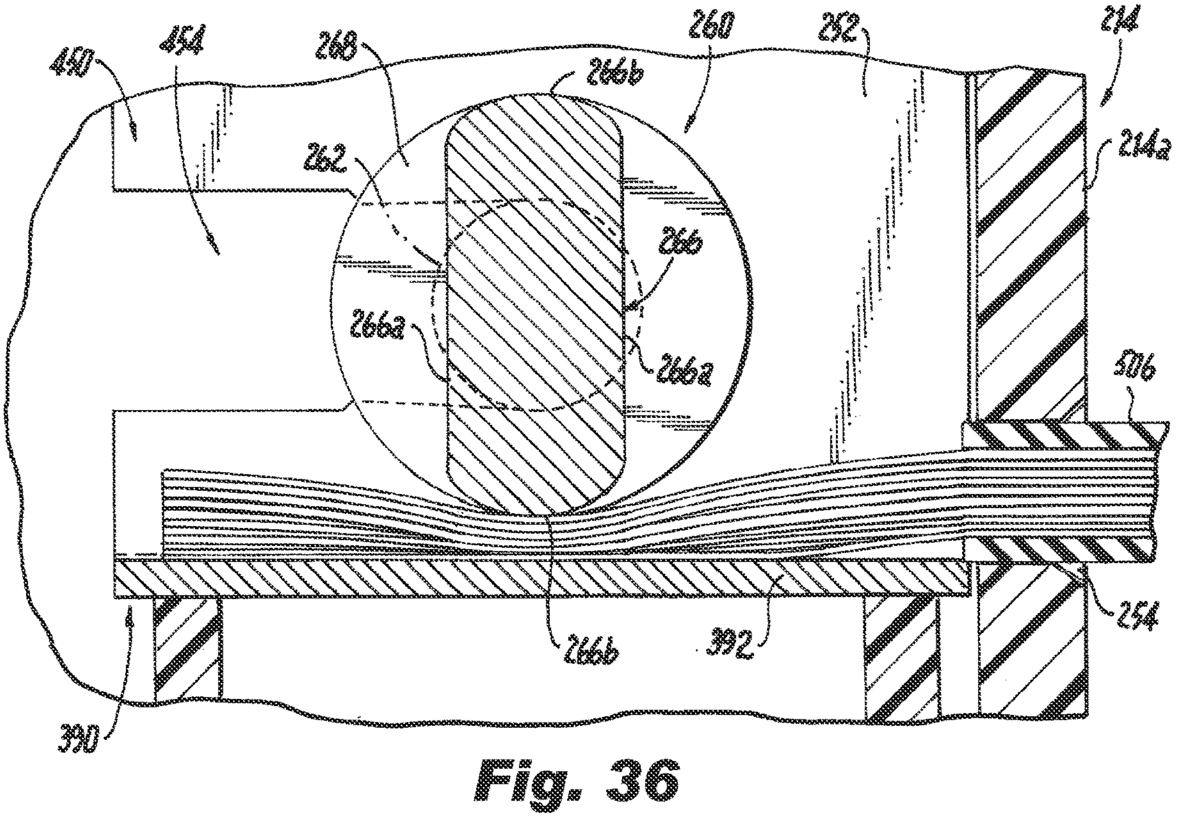
FIG. 36 is a cross-sectional view of the portion of the body of the electrical wiring device of FIG. 34 taken from line 36-36, and illustrating a stranded electrical wire inserted into a wire chamber within the body and the wire fastening member of the wire termination assembly in the securing position releasably securing the stranded electrical wire to the conductive member of the wire termination assembly.

Referring to FIGS. 35 and 36, the fastening of line (phase) and/or neutral stranded wires 506 to the device 200 will be described. Initially, each wire fastening member 260 is moved to the open position so that bare ends of wires, e.g., stranded wires 506, can be inserted through corresponding wire entry apertures 254 in the body 214 into wire chambers 252 adjacent the wire entry apertures 254. Stranded wires, e.g., wires 506, are then inserted through wire entry apertures 254 into the corresponding wire chambers 252. At this point the bare ends of each stranded wire to be fastened to the device 200 are at least partially within wire chambers 252 and between a flat surface 266*a* of a cam 266 and the respective conductive member 380, as shown in FIG. 35. The head 264 of the cam shaft 262 of each wire fastening member 260 is then moved, e.g., rotated or pivoted, to the securing position, as seen in FIG. 36. As the head 264 of the cam shaft 262 is rotated, the surface 266*b* of the cam 266 rotates so that the surface 266*b* engages the bare end of wires within the wire chamber 252 until the wire fastening member 260 is in the securing position. As noted, when the wire fastening member 260 is in the securing position, a force is applied to the bare end of the stranded wire, e.g., wire 506, such that the wire is pushed, urged or otherwise pressed against the flat plate 392 of the conductive member 390 so that a conductive path is created between the stranded wire and the conductive member 390.

Figure 37:
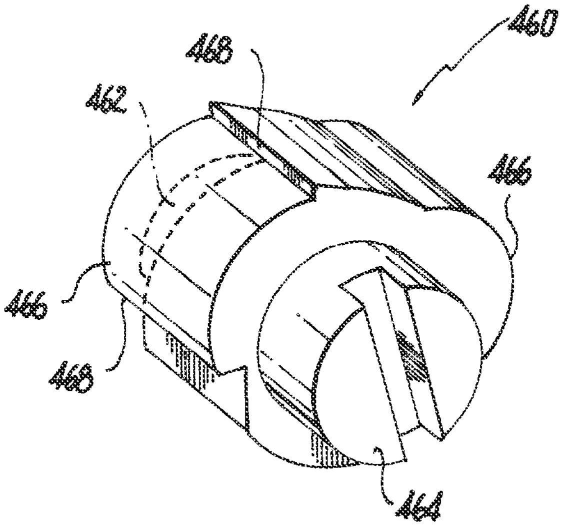
FIG. 37 is a perspective view of another exemplary embodiment of a wire fastening member that can be included in the wire termination assemblies of the present disclosure.
Figure 38:
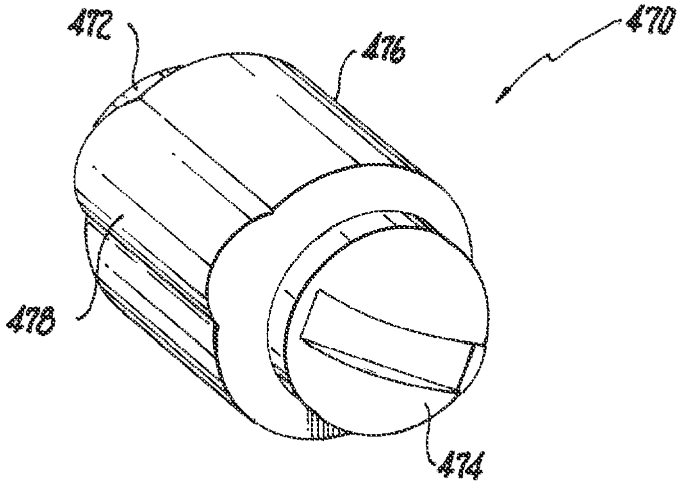
FIG. 38 is a perspective view of another exemplary embodiment of a wire fastening member that can be included in the wire termination assemblies of the present disclosure.

Referring to FIGS. 37 and 38, additional exemplary embodiments of the wire fastening member that can be included in the devices according to the present disclosure are shown. In FIG. 37, the wire fastening member 460 is a cam screw. The cam screw 460 has a cam shaft 462 having a head 464. The cam shaft 462 includes one or more cam surfaces 466 and one or more stops 468. The cam shaft 462 may be rotatably mounted to the conductive member, e.g., conductive member 280 described above, or to the body 214 so that the cam shaft 462 can rotate or pivot within the wire chamber 252 similar to that described above for the other embodiments of the wire fastening member described herein. The rotating or pivoting of the cam shaft head 464 causes the cam shaft 462 to rotate or pivot between an open position and a securing position. When the wire fastening member 460 is in the open position a bare end of a wire can be inserted into a respective wire chamber, as described above. When the wire fastening member 460 is in the securing position, a force is applied to the bare end of the wire by one of the cam surfaces 466 such that the wire is pushed, urged or otherwise pressed into contact with a conductive member, e.g., conductive member 280 described above, so that a conductive path is created between the wire and the conductive member. The one or more stops 468 can be provided to limit rotation of the cam shaft 462.

In FIG. 38, the wire fastening member 470 is a cam screw. The cam screw 470 has a cam shaft 472 having a head 474. The cam shaft 472 includes a large diameter portion 476 and one or more cam surfaces 478. The cam shaft 472 may be rotatably mounted to a conductive member, e.g., conductive member 280 described above, or to the body 214 so that the cam shaft 472 can rotate or pivot within the wire chamber 252 similar to that described above for the other embodiments of the wire fastening member described herein. The rotating or pivoting of the cam shaft head 474 causes the cam shaft 472 to rotate or pivot between an open position and a securing position. When the wire fastening member 470 is in the open position a bare end of a wire can be inserted into a respective wire chamber, as described above. When the wire fastening member 470 is in the securing position, a force is applied to the bare end of the wire by one of the one or more cam surfaces 478 such that the wire is pushed, urged or otherwise pressed into contact with a conductive member, e.g., conductive member 280 described above, so that a conductive path is created between the wire and the conductive member 280.

Figure 39:
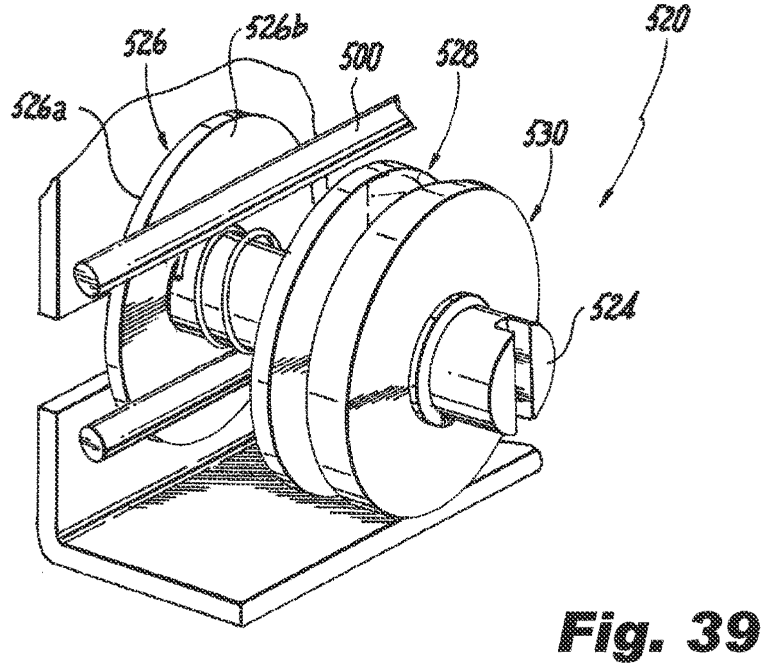
FIG. 39 is a perspective view of another exemplary embodiment of a wire termination assembly according to the present disclosure, illustrating a wire fastening member having pressure plates to secure wires to the wire fastening member.
Figure 40:
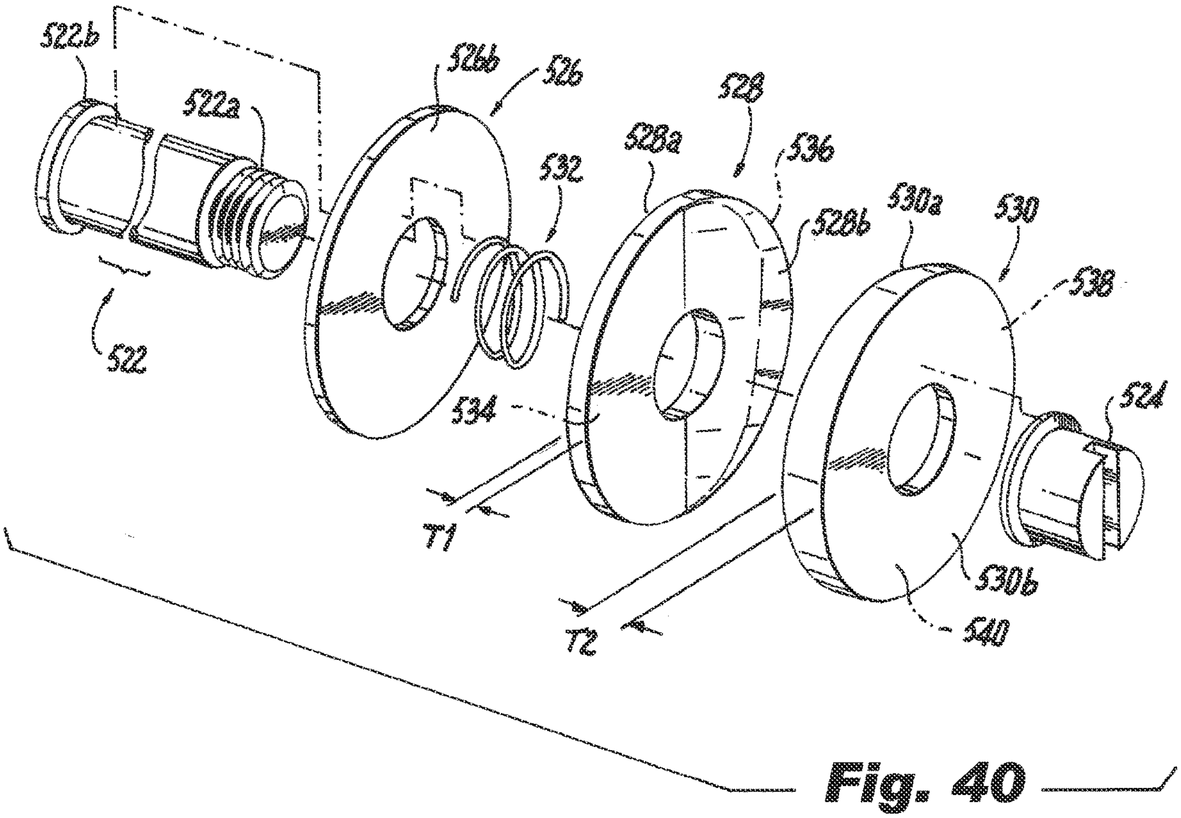
FIG. 40 is an exploded perspective view of the wire termination assembly of FIG. 39.
Figure 41:
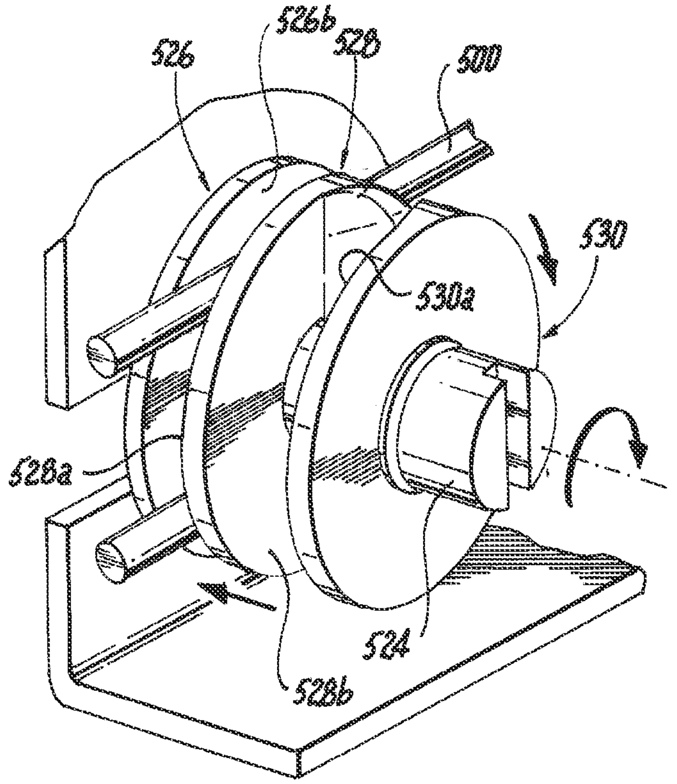
FIG. 41 is a perspective view of the wire termination assembly of FIG. 39, illustrating the pressure plates securing wires to the wire fastening member.

Referring to FIGS. 39-41, another exemplary embodiment of the wire fastening member that can be included in the devices according to the present disclosure are shown. In this exemplary embodiment the wire fastening member 520 includes a shaft 522 having a threaded end 522*a* and a stop end 522*b*. Positioned on the shaft 522 is a first pressure plate 526, a second pressure plate 528 and a drive plate 530. A spring 532 may be positioned on the shaft 522 between the first pressure plate 526 and the second pressure plate 528, as shown in FIG. 40. The spring 532 normally biases the second pressure plate 528 away from the first pressure plate 526 creating a gap between the pressure plates that is sufficient to receive wires, e.g., wires 500, 502 and/or 506, passed through wire entry apertures, e.g., wire entry apertures 254 in the base 214, into a wire chamber, e.g., wire chamber 252 in the base 214. The first pressure plate 526 in this exemplary embodiment is a cylindrical plate having a flat top surface 526*a* and a flat bottom surface 526*b*. The second pressure plate 528 in this exemplary embodiment is a cylindrical plate having a flat top surface 528*a* and an asymmetrical bottom surface 528*b*. The asymmetrical bottom surface 528*b* includes a low side 534 where a thickness "T1" of a portion of the second pressure plate 528, e.g., about ½ the plate, is smaller than a thickness "T2" of a high side 536 of the second pressure plate 528. The drive plate 530 in this exemplary embodiment is a cylindrical plate having an asymmetrical top surface 528*a* and a flat bottom surface 530*b*. A head 524 is attached to the flat bottom surface 530*b* of the drive plate 530 and is configured to be attached to the threaded end 522*a* of the shaft 522. The asymmetrical top surface 530*a* includes a low side 538 where a thickness "T1" of a portion of the drive plate 530. e.g., about ½ the plate, is smaller than a thickness "T2" of a high side 540 of the drive plate 530. In this embodiment, the bottom surface 528*b* of the second pressure plate 528 is configured to mate with the top surface 530*a* of the drive plate 530 such that the low side 534 of the second pressure plate 528 mates with the high side 540 of the drive plate 530, and such that high side 536 of the second pressure plate 528 mates with the low side 538 of the drive plate 530, as seen if FIG. 39.

The shaft 522 may be rotatably mounted to the conductive member, e.g., conductive member 280 described above, or to the body of the device, e.g., body 214 of device 200, so that the shaft 522 can rotate or pivot within a wire chamber, e.g., wire chamber 252, similar to that described above for the other embodiments of the wire fastening member described herein. The rotating or pivoting of the head 524 causes the drive plate 530 to rotate between an open position, seen in FIG. 39, and a securing position, seen in FIG. 41. When the wire fastening member 520 is in the open position a bare end of a wire can be inserted into the gap between the first pressure plate 526 and the second pressure plate 528 created by the spring 532. When the head 524 rotated from the open position to the securing position, the drive plate 530 rotates causing the high side 540 of the drive plate 530 to engage the high side 536 of the second pressure plate 528, and causing the second pressure plate 528 to move linearly toward the first pressure plate 526. The linear movement of the second pressure plate 528 captures the wires between the flat top surface 528*a* of the second pressure plate 528 and the flat bottom surface 526*b* of the first pressure plate 526 and applies a force to the bare end of the wire between the pressure plates such that the wire is held between the pressure plates so that a conductive path is created between the wire and the conductive member. To release the wires from the wire fastening member 520, the head 524 is rotated so that the drive plate 530 rotates causing the low side 538 of the drive plate 530 to engage the low side 534 of the second pressure plate 528, and the spring 532 biases the second pressure plate 528 away from the first pressure plate 526 creating the gap and allowing the wires to be removed from the wire chamber.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical wiring device comprising:

a cover; and a base having a wire chamber supporting a wire termination assembly, wherein the wire termination assembly includes:

a wire fastening member having at least one wire engaging surface, the wire fastening member being movable between an open position and a securing position;

a conductive member in close proximity to the wire fastening member such that a gap is provided between the at least one wire engaging surface and the conductive member when the wire fastening member is in the open position, and when an electrical conductor is positioned in the gap and the wire fastening member is moved from the open position to the securing position, the at least one wire engaging surface moves to engage the electrical conductor; and a locking assembly having at least one holding member included on the base and configured to interact with at least a longitudinal surface of the wire fastening member so as to hold the wire fastening member in the securing position.

2. The electrical wiring device according to claim 1, wherein the wire fastening member is rotatable between the open position and the securing position.

3. The electrical wiring device according to claim 1, wherein the wire fastening member comprises a cam body and a lever arm, and wherein rotation of the lever arm causes the cam body to rotate between the open position and the securing position.

4. The electrical wiring device according to claim 3, wherein the cam body comprises a mounting aperture and one or more wire engaging surfaces, the mounting aperture being configured to receive a mounting pin that rotatably secures the cam body to the base.

5. The electrical wiring device according to claim 1, wherein the wire fastening member comprises a cam shaft and a head, the cam shaft having at least one cam, and wherein rotation of the cam shaft causes the at least one cam to rotate between the open position and the securing position.

6. The electrical wiring device according to claim 1, wherein the conductive member includes at least one wire gripping member extending in a direction towards the gap.

7. The electrical wiring device according to claim 6, wherein the conductive member comprises an electrically conductive plate and the at least one wire gripping member comprises a barb extending from the plate.

8. The electrical wiring device according to claim 6, wherein the conductive member comprises an electrically conductive plate and the wire gripping member comprises a pocket.

9. The electrical wiring device according to claim 1, wherein the at least one holding member comprises a detent.

10. An electrical wiring device comprising:

a cover;

a base having a wire chamber; and a wire termination assembly including:

a wire fastening member positioned within the wire chamber and having at least one wire engaging surface, the wire fastening member being rotatable between an open position and a securing position;

a conductive member positioned within the wire chamber in close proximity to the wire fastening member such that a gap is provided between the at least one wire engaging surface and the conductive member when the wire fastening member is in the open position, and when the electrical conductor is inserted in the wire chamber and the wire fastening member is rotated from the open position to the securing position, the at least one wire engaging surface rotates to engage the electrical conductor; and a locking assembly having at least one holding member positioned on the base and configured to interact with at least a longitudinal surface of the wire fastening member so as to hold the wire fastening member in the securing position.

11. The electrical wiring device according to claim 10, wherein the wire fastening member comprises a cam body and a lever arm, and wherein when the wire fastening member is in the securing position the at least one holding member releasably holds a surface of the lever arm in the securing position.

12. The electrical wiring device according to claim 10, wherein the wire fastening member comprises a cam body and a lever arm extending from the cam body, and wherein rotation of the lever arm causes the cam body to rotate between the open position and the securing position.

13. The electrical wiring device according to claim 12, wherein the cam body comprises a mounting aperture and one or more wire engaging surfaces, the mounting aperture being configured to receive a mounting pin that rotatably secures the cam body to the base.

14. The electrical wiring device according to claim 10, wherein the wire fastening member comprises a cam shaft and a head, the cam shaft having at least one cam, and wherein rotation of the cam shaft causes the at least one cam to rotate between the open position and the securing position.

15. The electrical wiring device according to claim 10, wherein the conductive member includes at least one wire gripping member extending in a direction towards the gap.

16. The electrical wiring device according to claim 15, wherein the conductive member comprises an electrically conductive plate and the at least one wire gripping member comprises a barb extending from the plate.

17. The electrical wiring device according to claim 15, wherein the conductive member comprises an electrically conductive plate and the at least one wire gripping member comprises a pocket.

18. The electrical wiring device according to claim 10, wherein the at least one holding member comprises a detent.

19. An electrical wiring device comprising:

a cover;

a base having a plurality of wire chambers; and a plurality of wire termination assemblies, wherein one of the plurality of wire termination assemblies is associated with one of the plurality of wire chambers, each wire termination assembly including:

a wire fastening member positioned within the wire chamber and having at least one wire engaging surface, the wire fastening member being movable between an open position and a securing position;

a conductive member positioned within the wire chamber in close proximity to the wire fastening member such that a gap is provided between the at least one wire engaging surface and the conductive member when the wire fastening member is in the open position, and when the electrical conductor is positioned in the gap and the wire fastening member is moved from the open position to the securing position, the at least one wire engaging surface moves to engage the electrical conductor; and a locking assembly having at least one holding member included on the base and configured to interact with at least a longitudinal surface of the wire fastening member so as to hold the wire fastening member in the securing position.

20. The electrical wiring device according to claim 19, wherein the wire fastening member is rotatable between the open position and the securing position.

21. The electrical wiring device according to claim 19, wherein the wire fastening member comprises a cam body and a lever arm extending from the cam body, and wherein rotation of the lever arm causes the cam body to rotate between the open position and the securing position.

22. The electrical wiring device according to claim 21, wherein the cam body comprises a mounting aperture and one or more wire engaging surfaces, the mounting aperture being configured to receive a mounting pin that rotatably secures the cam body to the base.

23. The electrical wiring device according to claim 19, wherein the wire fastening member comprises a cam shaft and a head, the cam shaft having at least one cam, and wherein rotation of the cam shaft causes the at least one cam to rotate between the open position and the securing position.

24. The electrical wiring device according to claim 19, wherein the conductive member includes at least one wire gripping member extending in a direction towards the gap.

25. The electrical wiring device according to claim 24, wherein the conductive member comprises an electrically conductive plate and the at least one wire gripping member comprises a barb extending from the plate.

26. The electrical wiring device according to claim 24, wherein the conductive member comprises an electrically conductive plate and the at least one wire gripping member comprises a pocket.

27. The electrical wiring device according to claim 19, wherein the at least one holding member comprises a detent.

* * * * *